United States Patent
Shyr et al.

(10) Patent No.: US 9,460,236 B2
(45) Date of Patent: *Oct. 4, 2016

(54) ADAPTIVE VARIABLE SELECTION FOR DATA CLUSTERING

(71) Applicant: International Business Machines Corporation, Armonk, NY (US)

(72) Inventors: Jing-Yun Shyr, Naperville, IL (US); Damir Spisic, Chicago, IL (US); Jing Xu, Xian (CN)

(73) Assignee: International Business Machines Corporation, Armonk, NY (US)

( * ) Notice: Subject to any disclaimer, the term of this patent is extended or adjusted under 35 U.S.C. 154(b) by 133 days.

This patent is subject to a terminal disclaimer.

(21) Appl. No.: 14/554,102

(22) Filed: Nov. 26, 2014

(65) Prior Publication Data

US 2015/0286704 A1 Oct. 8, 2015

Related U.S. Application Data

(63) Continuation of application No. 14/247,377, filed on Apr. 8, 2014.

(51) Int. Cl.
*G06F 17/30* (2006.01)

(52) U.S. Cl.
CPC ... *G06F 17/30961* (2013.01); *G06F 17/30705* (2013.01)

(58) Field of Classification Search
None
See application file for complete search history.

(56) References Cited

U.S. PATENT DOCUMENTS

| | | | |
|---|---|---|---|
| 5,832,182 A | 11/1998 | Zhang et al. | |
| 8,224,622 B2 | 7/2012 | Kumar et al. | |
| 8,528,088 B2 | 9/2013 | Wright et al. | |
| 9,141,622 B1* | 9/2015 | Moore | G06F 17/3007 |
| 9,305,076 B1* | 4/2016 | Kadarkarai | G06F 17/30598 |
| 2008/0201102 A1* | 8/2008 | Boettcher | G06K 9/6219 702/179 |
| 2011/0184896 A1 | 7/2011 | Guyon | |
| 2013/0024159 A1 | 1/2013 | Ghoting et al. | |
| 2014/0143251 A1* | 5/2014 | Wang | G06F 17/30598 707/737 |
| 2014/0365529 A1* | 12/2014 | Aila | G06F 17/30961 707/797 |

FOREIGN PATENT DOCUMENTS

WO   2005008571 A1   1/2005

OTHER PUBLICATIONS

Appendix P List of IBM Patents or Patent Applications Treated As Related.

(Continued)

*Primary Examiner* — Richard Bowen
(74) *Attorney, Agent, or Firm* — Isaac J. Gooshaw

(57) ABSTRACT

One or more processors generate subsets of cluster feature (CF)-trees, which represent respective sets of local data as leaf entries. One or more processors collect variables that were used to generate the CF-trees included in the subsets. One or more processors generate respective approximate clustering solutions for the subsets by applying hierarchical agglomerative clustering to the collected variables and leaf entries of the plurality of CF-trees. One or more processors select candidate sets of variables with maximal goodness that are locally optimal for respective subsets based on the approximate clustering solutions. One or more processors select a set of variables, which produce an overall clustering solution, from the candidate sets of variables.

7 Claims, 7 Drawing Sheets

(56) References Cited

OTHER PUBLICATIONS

Al-Zoubi, "An Effective Clustering-Based Approach for Outlier Detection", European Journal of Scientific Research, ISSN 1450-216X vol. 28 No. 2 (2009), pp. 310-316, © EuroJournals Publishing, Inc. 2009, <http:www.eurojournals.com/ejsr.htm>.
Chawla et al., "k-means-: A unified approach to clustering and outlier detection", SIAM Conference on Data Mining (SDM) (2013), pp. 189-198, downloaded from knowledgecenter.siam.org, Copyright © SIAM.
Chiu et al., "A Robust and Scalable Clustering Algorithm for Mixed Type Attributes in Large Database Environment", pp. 263-268, Copyright ACM 2001 1-58113-391-x/01/08, provided in post disclosure on Jul. 23, 2013.
Dy et al., "Feature Selection for Unsupervised Learning", Journal of Machine Learning Research 5 (2004) 845-889 Submitted Nov. 2000; Published Aug. 2004.
Jiang et al., "Clustering-Based Outlier Detection Method", Fifth International Conference on Fuzzy Systems and Knowledge Discovery, pp. 429-433, 978-0-7695-3305-6/08 $25.00 © 2008 IEEE, DOI 10.1109/FSKD.2008.244.
Kim, et al., "Evolutionary model selection in unsupervised learning", Intelligent Data Analysis 6 (2002) 531-556, 1088-467X/02/, Copyright 2002—IOS Press.
Loureiro et al., "Outlier Detection Using Clustering Methods: a data cleaning application", University of Porto, R. Campo Alegre, 823, 4150 Porto, Portugal, in Proceedings of KDNet Symposium on Knowledge-Based Systems for the public Sector. Bonn, Germany, 2004.
Mocian, "Survey of Distributed Clustering Techniques", Imperial College London, 1st term ISO report, (2010).
Samatova et al., "RACHET: An Efficient Cover-Based Merging of Clustering Hierarchies from Distributed Datasets", Distributed and Parallel Databases, 11, 157-180, 2002, © 2002 Kluwer Academic Publishers, Manufactured in The Netherlands.
Zhang et al., "BIRCH: An Efficient Data Clustering Method for Very Large Databases", SIGMOD '96 Jun. 96 Montreal, Canada, Copyright 1996 ACM 0-89791-794-4/96/0006, pp. 103-114.
"Interactive Outlier Analysis on Columnar Databases", An IP.com Prior Art Database Technical Disclosure, Authors et. al.: Disclosed Anonymously, IP.com No. IPCOM000203006D, IP.com Electronic Publication: Jan. 14, 2011, pp. 1-6.
SPI DST, et al., IP.com, "Clustering Techniques: The User's Dilema", An IP.com Prior Art Database Technical Disclosure, Original Publication Date: Nov. 30, 1975, IP.com No. IPCOM000148956D, IP.com Electronic Publication: Mar. 30, 2007, Database entry Copyright (c) Software Patent Institute, pp. 1-7.
U.S. Appl. No. 14/247,377, entitled "Adaptive Variable Selection for Data Clustering", filed Apr. 8, 2014.

\* cited by examiner

Table 6

Step 1. Divide the distributed data into data splits.
Step 2. Build a local CF-tree on each data split.
Step 3. Distribute local CF-trees into multiple computing units. A unique key is assigned to each CF-tree .
Step 4. On each computing unit, start with all available features:
    a. Perform matrix based HAC with selected features on the leaf entries to get an approximate clustering solution. Suppose there are $J^*$ final clusters.
    b. Compute goodness for the approximate clustering solution.
    c. If the goodness measure is improved,
        i. Compute feature importance for the set of selected features.
        ii. Decompose information criterion and distance measure by features for each clustering solution along the hierarchical tree with the number of clusters between $J_{min}$ and $J_{max}$
        iii. If the number of clusters is determined automatically, repeat to discard the most unimportant features until the optimal number of clusters determined by the remaining features is less than $J^*$.
            Else, discard the most unimportant features.
        iv. Go to step a).
    d. Select the set of features with the maximal goodness.
Step 5. Pour together all the sets of features produced by different computing units. Discard any feature if its occurring frequency is less than $R * \beta$ (default $\beta = 50\%$). The remaining features will be used to build the final clustering solution.

FIG. 5

Table 7

| |
|---|
| Step 1.    Divide the distributed data into data splits.<br>Step 2.    Build a local CF-tree on each data split.<br>Step 3.    Distribute local CF-trees into multiple computing units. Note that multiple CF-trees may be distributed to the same computing unit.<br>Step 4.    On each computing unit, with all CF-entries in the involved CF-trees, perform a series of CF-tree based HACs, and get a specified number of sub-clusters.<br>Step 5.    Pour together all the sub-clusters produced by different computing unit, and perform matrix based HAC to get the final clusters.<br><br>The number of final clusters is determined automatically or using a fixed one depending on the settings. |

FIG. 6

Table 8

| | | |
|---|---|---|
| Step 1. | | On each data split, perform the following: |
| | a | Generate local candidate outliers according to the method described in section 6. |
| | b. | Distribute the local candidate outliers together with the associated CF-tree to a certain computing unit. |

Step 2. Each computing unit is allocated with a set of candidate outliers and also a set of CF-trees containing regular leaf entries. For each member in the set of candidate outliers, it will be merged with the closest regular leaf entry only if the merging does not break the maximal tightness threshold among the involved CF-trees. Note that the CF-trees are passed in order to enhance the performance of finding the closest regular leaf entry.

Step 3. Pour together all the remaining candidate outliers and sub-clusters produced by computing machines, do the following:

1) Perform matrix based HAC on sub-clusters, and get the final regular clusters.

2) For each remaining candidate outlier, evaluate its outlier strength using equation (30).

3) Keep only candidate outliers whose distance from the closest regular cluster to the outlier candidate is greater than the corresponding cluster distance threshold $D_t(j)$ 4) Merge the rest of candidate outliers with the corresponding closest regular clusters and update the distance threshold for each regular cluster.

5) For each remaining outlier cluster, update its outlier strength.

6) Sort remaining outlier clusters according to outlier strength in descending order, and get the minimum outlier strength for the top P (default 5%) percent of outliers, and use it as an outlier threshold in scoring.

7) Export a specified number of the most extreme outlier clusters (default 20), along with the following measures for each cluster: cluster size, outlier strength, probabilities of belonging to each regular cluster.

ADAPTIVE VARIABLE SELECTION FOR DATA CLUSTERING

BACKGROUND OF THE INVENTION

The present invention relates generally to the field of data clustering, and more particularly to distributed data clustering.

Clustering techniques are widely used by retail and consumer product companies who need to learn more about their customers in order to apply 1-to-1 marketing strategy. By application of clustering techniques, customers are partitioned into groups by their buying habits, gender, age, income level etc. Retail and consumer product companies can then use the cluster information to tailor their marketing and product development strategy to each customer group.

Traditional clustering algorithms can broadly be classified into partitional clustering and hierarchical clustering. Partitional clustering algorithms divide data cases into clusters by optimizing certain criterion function. A well-known representative of this class is the k-means clustering. Hierarchical clustering algorithms proceed by stages that produce a sequence of partitions with each partition being nested into the next partition in the sequence. Notice that no initial values are needed for hierarchical clustering. Hierarchical clustering can be agglomerative and divisive. Agglomerative clustering starts with a singleton cluster (i.e. a cluster that contains one data case only) and proceeds by successively merging that cluster with other clusters. In contrast, divisive clustering starts with one single cluster that contains all data cases and proceeds by successively separating the cluster into smaller ones.

SUMMARY

Embodiments of the present invention provide a method, system, and program product to select cluster variables. One or more processors generate a plurality of subsets of a plurality of cluster feature (CF)-trees, wherein each CF-tree represents a respective set of local data as leaf entries. One or more processors collect a plurality of variables that were used to generate a plurality of CF-trees included in a subset. One or more processors generate respective approximate clustering solutions for the plurality of subsets by applying hierarchical agglomerative clustering to, at least in part, the collected variables and leaf entries of the plurality of CF-trees. One or more processors select a plurality of candidate sets of variables with maximal goodness that are locally optimal for respective subsets based, at least in part, on the approximate clustering solutions. One or more processors select a set of variables from the plurality of candidate sets of variables that produces an overall clustering solution.

BRIEF DESCRIPTION OF THE SEVERAL VIEWS OF THE DRAWINGS

FIG. 5 illustrates Table 6, which includes steps for adaptive feature selection, in accordance with an exemplary embodiment of the present invention.

FIG. 6 illustrates Table 7, which includes steps for identifying clusters from distributed data with high performance and accuracy, in accordance with an exemplary embodiment of the present invention.

FIG. 7 illustrates Table 8, which includes steps to extend outlier detection into the distributed setting, in accordance with an exemplary embodiment of the present invention.

DETAILED DESCRIPTION

Figure 1:
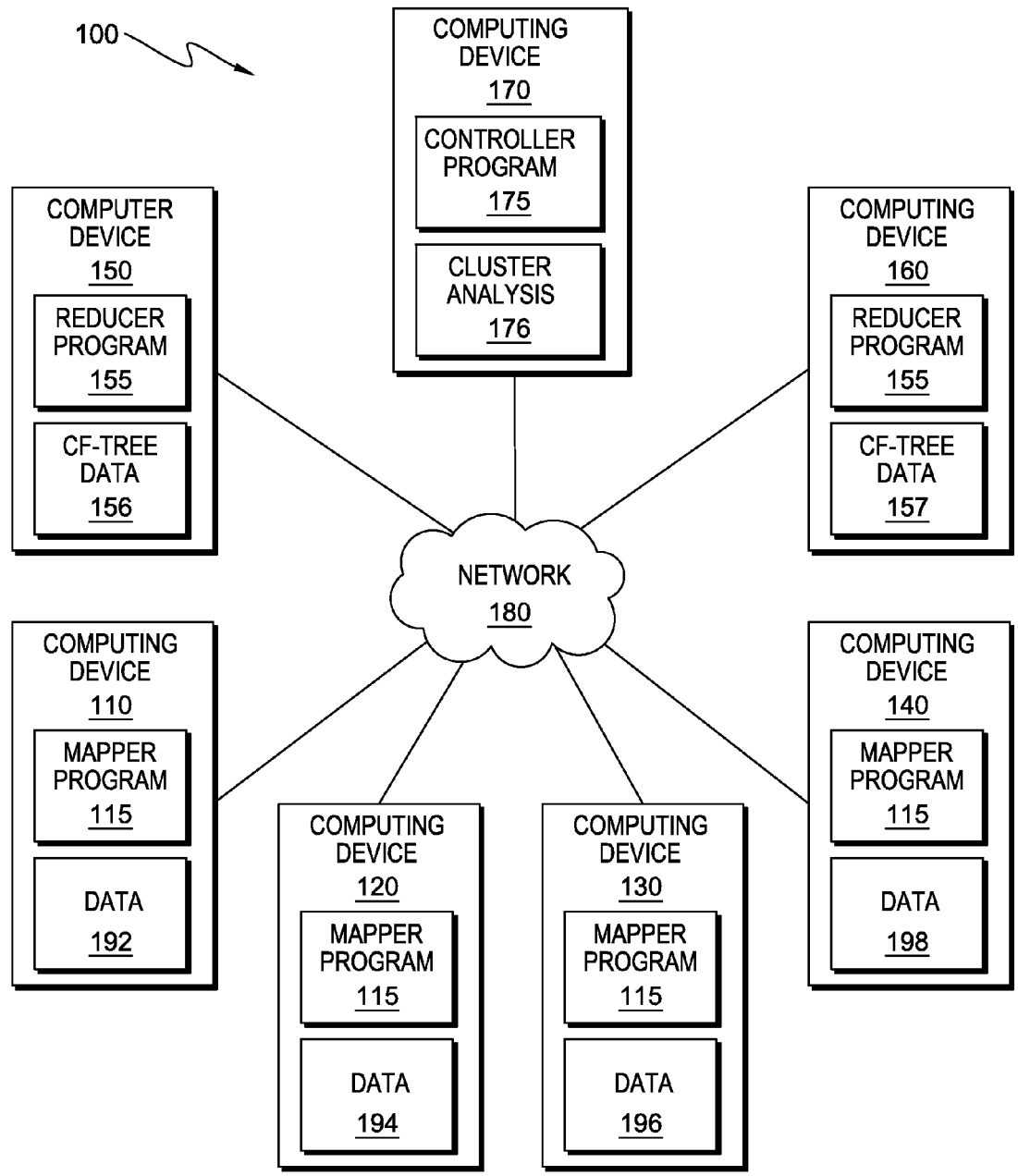
FIG. 1 is a functional block diagram illustrating a distributed computing environment, in accordance with an exemplary embodiment of the present invention.

Some embodiments of the present invention recognize one or more of the following: (i) a method that includes maximum likelihood or scatter separability criteria addresses the problem of determining clustering solutions for large datasets while minimizing computational expense; (ii) that an efficient wrapper approach of variable selection for clustering will reduce computational expense; (iii) that performing distributed data analysis in a parallel framework can distribute computational expense; (iv) that summarizing local data records through cluster feature (CF)-tree(s) can reduce computational expense; (v) that an assessment of variables by building approximate clustering solutions iteratively on the CF-trees can reduce computational expense; (vi) that computational expense can be minimized by utilizing only one data pass over the given data, which allows for an efficient building of clustering solutions on large and distributed data sources; (vii) that the stability of the clustering result is further ensured by application of an ensemble technique for final variable selection; (viii) that distributed data can be processed by application of repeated hierarchical clustering on leaf entries from multiple CF-trees; (ix) that only selected variables in the CF-trees are considered in each clustering iteration and that the selection is based on internally specified criteria; (x) that an element of the clustering algorithm is a distance measure that reflects the relative similarity or dissimilarity of the clusters; (xi) that a common distance measure is used in both the CF-tree growth and the clustering process; (xii) that wrapper methods can produce better clustering since the wrapper model aims to select variables that maximize the clustering solution quality; (xiii) that known wrapper model methods are very computationally expensive and many data passes are needed during the clustering process; (xiv) that the performance of known wrapper methods typically decreases when handling very large and distributed data sources, because building a clustering model on the whole data is computationally demanding; and (xv) that building multiple models iteratively further increases computational demand, which further increases computational expense for known wrapper methods (see (xiii) and (xiv) above).

Embodiments of the present invention perform a preclustering step by scanning the entire dataset and storing the dense regions of data cases in terms of summary statistics called cluster features. The cluster features are stored in memory in a data structure called a CF-tree. An agglomerative hierarchical clustering algorithm is applied to cluster the set of cluster features and generate candidate sets of variables. Since the set of cluster features is much smaller than the original dataset, the hierarchical clustering can perform well in terms of speed. Notice that the CF-tree is incremental in the sense that it does not require the whole dataset in advance and only scans the dataset once. A stable and robust set of variables is selected from the candidate sets of variables. The selected set of variables produces an overall quality clustering solution based on each variable's respective frequency of appearance among candidate sets of variables.

In addition, a set of candidate outlier sub-clusters are identified that have a computed distance greater than the corresponding distance threshold of the closest regular cluster. Outlier clusters are sorted according to outlier strength in descending order, and the minimum outlier strength is determined for the top percent of outliers. This minimum outlier strength is then used as an outlier threshold for scoring. The outlier threshold is used for detection of outlier records rather than sub-clusters. A new data pass is applied and outlier strength computed for each record using the same formula as for the outlier sub-cluster. The records with outlier strength above the computed threshold are the outlier records.

The following portion of Detailed Description is divided into the following subsections: (i) The Hardware and Software Environment; (ii) Example Embodiment; and (iii) Further Comments and/or Embodiments.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating a distributed computing environment, generally designated 100, in accordance with one embodiment of the present invention. Distributed computing environment 100 includes computing device 110, 120, 130, 140, 150, 160 and 170 connected over network 180. Computing device 110, 120, 130, 140 respectively include mapper program 115. Computing device 110, 120, 130, 140 respectively include data 192, 194, 196 and 198. Computing device 150 and 160 both include reducer program 155, and respectively include CF-tree data 156 and 157. Computing device 170 includes controller program 175 and cluster analysis 176.

In various embodiments of the present invention, computing device 110, 120, 130, 140, 150, 160 and 170 are respectively a computing device that can be a standalone device, a server, a laptop computer, a tablet computer, a netbook computer, a personal computer (PC), or a desktop computer. In another embodiment, computing device 110, 120, 130, 140, 150, 160 and 170 respectively represent a computing system utilizing clustered computers and components to act as a single pool of seamless resources. In general, computing device 110, 120, 130, 140, 150, 160 and 170 can be any computing device or a combination of devices with access to mapper program 115, reducer program 155, controller program 175, CF-tree data 156 and 157, cluster analysis 176, and data 192, 194, 196 and 198 and is capable of executing mapper program 115, reducer program 155, and controller program 175. Computing device 110, 120, 130, 140, 150, 160 and 170 may include internal and external hardware components, as depicted and described in further detail with respect to FIG. 2.

In this exemplary embodiment, mapper program 115, reducer program 155, controller program 175, CF-tree data 156 and 157, cluster analysis 176, and data 192, 194, 196 and 198 are respectively stored on computing device 110, 120, 130, 140, 150, 160 and 170. However, in other embodiments, mapper program 115, reducer program 155, controller program 175, CF-tree data 156 and 157, cluster analysis 176, and data 192, 194, 196 and 198 may be stored externally and accessed through a communication network, such as network 180. Network 180 can be, for example, a local area network (LAN), a wide area network (WAN) such as the Internet, or a combination of the two, and may include wired, wireless, fiber optic or any other connection known in the art. In general, network 180 can be any combination of connections and protocols that will support communications between computing device 110, 120, 130, 140, 150, 160 and 170, and their respective programs and data, in accordance with a desired embodiment of the present invention.

In general, data 192, 194, 196 and 198, respectively include data that is generated by mapper program 115 or is received for processing by mapper program 115, such as data to be used to create CF-trees, in accordance with a desired embodiment of the present invention. Mapper program 115 is, in general, a mapping and clustering program (which may herein be referred to as a mapper) that accesses data 192, 194, 196 and 198, respectively and generates a subset of CF-trees, which is stored as part of CF-tree data 156 or 157, i.e., CF-tree data.

In general, CF-tree data 156 and 157 respectively include data that is generated by reducer program 155 or is received for processing by reducer program 155. This includes data that is stored as part of a CF-tree or its related files, in accordance with a desired embodiment of the present invention. Reducer program 155 is, in general, a reducer program (which may herein be referred to as a reducer) that generates a candidate set of variables and a set of sub-clusters, using CF-tree data, which correspond to the maximal goodness, which is locally optimal. In some embodiments, the output of each reducer task includes a set of candidate outliers.

In general, data included in cluster analysis 176 is data that is generated by controller program 175 or is received for processing by controller program 175, in accordance with a desired embodiment of the present invention. Controller program 175 is, in general, a control program (which may herein be referred to as a controller) that collects candidate sets of variables produced by each of the reducers, combines the collected sets of variables, and selects a stable and robust set of variables that produces an overall quality clustering solution based on each variable's respective frequency of appearance among candidate sets of variables produced by reducers. In some embodiments, controller program 175 utilizes sub-clusters and candidate outliers to generate an outlier threshold and outlier clusters, which can be sorted according to outlier strength. In such embodiments, the generated outlier threshold can be used for detection of outlier records rather than sub-clusters.

Figure 2:
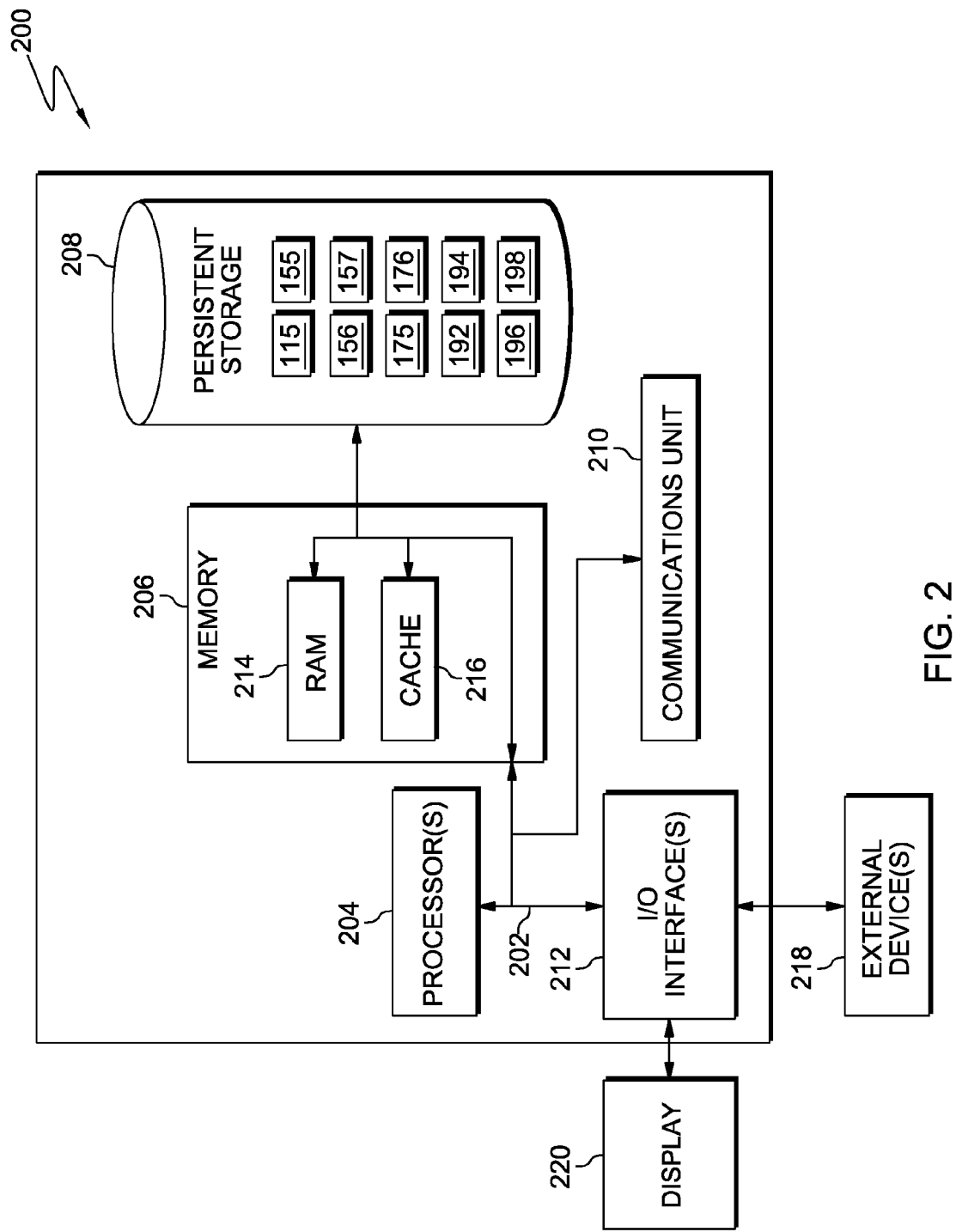
FIG. 2 depicts a block diagram of respective components of the computing device(s) executing a mapper program, a reducer program and a controller program, in accordance with an exemplary embodiment of the present invention.

FIG. 2 depicts a block diagram, 200, of respective components of computing device(s) 110, 120, 130, 140, 150, 160 and 170, in accordance with an illustrative embodiment of the present invention. It should be appreciated that FIG. 2 provides only an illustration of one implementation and does not imply any limitations with regard to the environments in which different embodiments may be implemented. Many modifications to the depicted environment may be made.

Computing device 110, 120, 130, 140, 150, 160 and 170 respectively include communications fabric 202, which provides communications between respective computer processor(s) 204, memory 206, persistent storage 208, communications unit 210, and input/output (I/O) interface(s) 212. Communications fabric 202 can be implemented with any architecture designed for passing data and/or control information between processors (such as microprocessors, communications and network processors, etc.), system memory, peripheral devices, and any other hardware components within a system. For example, communications fabric 202 can be implemented with one or more buses.

Memory 206 and persistent storage 208 are computer-readable storage media. In this embodiment, memory 206 includes random access memory (RAM) 214 and cache memory 216. In general, memory 206 can include any suitable volatile or non-volatile computer-readable storage media.

Mapper program 115, reducer program 155, controller program 175, CF-tree data 156 and 157, cluster analysis 176, and data 192, 194, 196 and 198 are stored in persistent storage 208 for execution and/or access by one or more of the respective computer processors 204 via one or more memories of memory 206. In this embodiment, persistent storage 208 includes a magnetic hard disk drive. Alternatively, or in addition to a magnetic hard disk drive, persistent storage 208 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 208 may also be removable. For example, a removable hard drive may be used for persistent storage 208. Other examples include optical and magnetic disks, thumb drives, and smart cards that are inserted into a drive for transfer onto another computer-readable storage medium that is also part of persistent storage 208.

Communications unit 210, in these examples, provides for communications with other data processing systems or devices, including resources of network 180. In these examples, communications unit 210 includes one or more network interface cards. Communications unit 210 may provide communications through the use of either or both physical and wireless communications links. Mapper program 115, reducer program 155, controller program 175, CF-tree data 156 and 157, cluster analysis 176, and data 192, 194, 196 and 198 may be downloaded to persistent storage 208 through communications unit 210.

I/O interface(s) 212 allows for input and output of data with other devices that may be respectively connected to computing device 110, 120, 130, 140, 150, 160 and 170. For example, I/O interface 212 may provide a connection to external devices 218 such as a keyboard, keypad, a touch screen, and/or some other suitable input device. External devices 218 can also include portable computer-readable storage media such as, for example, thumb drives, portable optical or magnetic disks, and memory cards. Software and data used to practice embodiments of the present invention, e.g., mapper program 115, reducer program 155, controller program 175, CF-tree data 156 and 157, cluster analysis 176, and data 192, 194, 196 and 198, can be stored on such portable computer-readable storage media and can be loaded onto persistent storage 208 via I/O interface(s) 212. I/O interface(s) 212 also connect to a display 220.

Display 220 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

II. Example Embodiment

Overview: In this exemplary embodiment, a distributed data analysis is performed in a parallel framework. In contrast to constructing a global similarity matrix, local data records are summarized through CF-trees (Note: a CF-tree is a very compact summary of a dataset in the way that each entry in the leaf node is a sub-cluster which absorbs the data records that are close together). Exemplary embodiments build local CF-trees separately on different data sources, and use them to build approximate hierarchical clustering solutions, iteratively, on multiple computing machines. Further, variables are assessed during the building of the approximate hierarchical clustering solutions. In this way, exemplary embodiments need only one data pass over the given data to build clustering solutions efficiently on large and distributed data sources. This exemplary embodiment collects all the candidate sets of variables, produced by the multiple computing machines, and derives the final set of selected variables using an ensemble technique for final variable selection. In some cases using an ensemble technique for final variable selection further ensures stability of the clustering result.

Embodiments of the present invention recognize one or more of the following advantages: 1) local data sources are handled in parallel, which speeds up the process of reading data; 2) approximate clustering solutions are built on CF-trees, instead of individual records, which makes the iterative process of building clusters more efficient, and only one data pass is needed; 3) variables are selected effectively through approximate clustering solutions that are built in parallel, which ensures better clustering quality while leveraging available computing resources as much as possible; 4) the ensemble method provides a set of variables which endows a more robust clustering result, e.g., irrelevant, noise, or outlier variables can be removed more effectively; 5) generating an overall clustering solution for distributed data together with outlier selection; 6) generating a selection of candidate outliers and evaluating those candidate outliers against regular clusters (not outlier clusters) to yield a final set of actual outliers; and 7) both regular clusters and outliers are identified in a distributed setting based on the concept of outlier strength.

Figure 3:
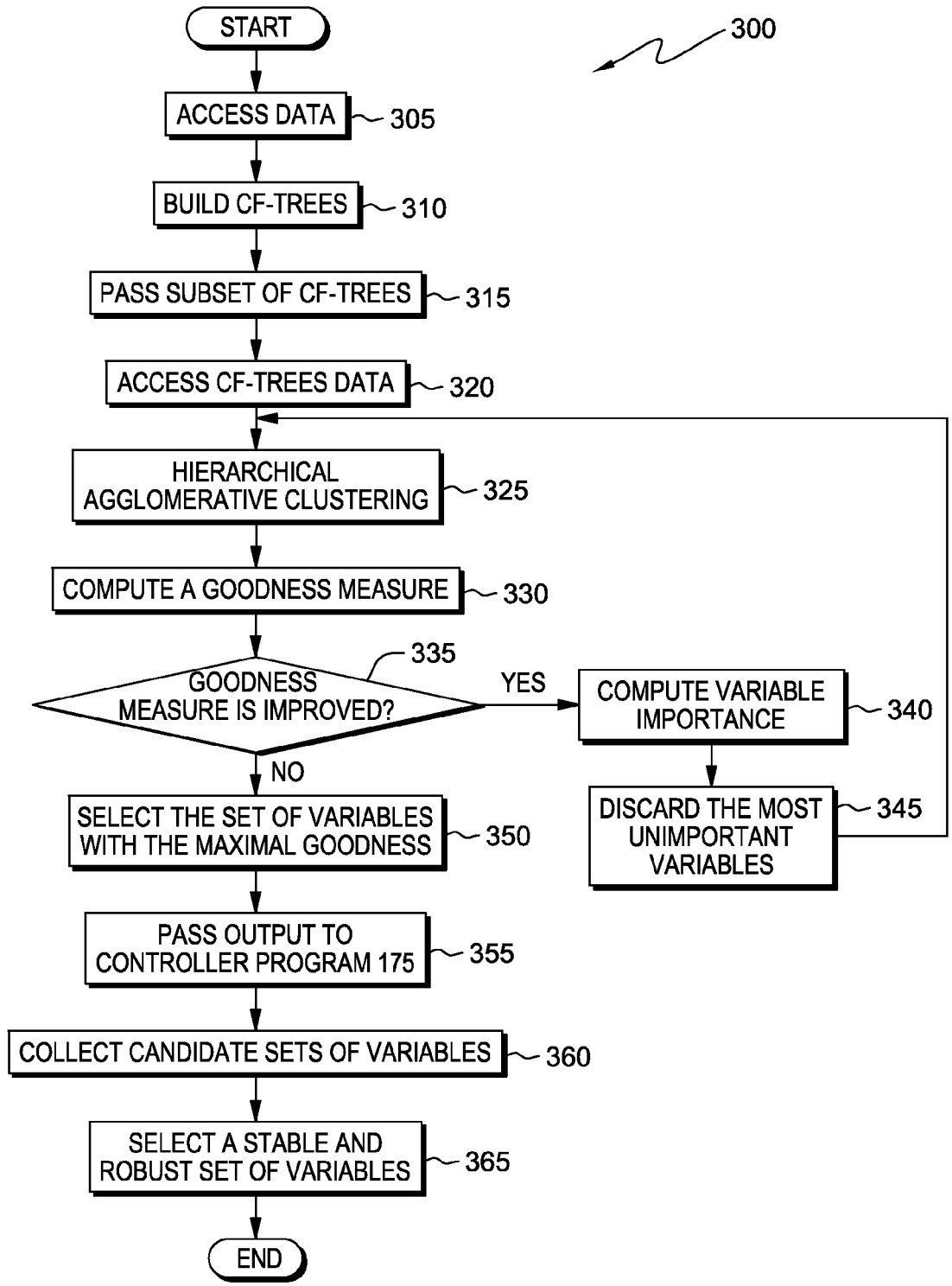
FIG. 3 illustrates operational processes of a method for adaptive variable selection, in accordance with an exemplary embodiment of the present invention.

FIG. 3 illustrates a flowchart, 300, of a method of adaptive variable selection, based on operational processes of mapper program 115, reducer program 155, and controller program 175 respectively executing on computing devices 110, 120, 130, 140, 150, 160 and 170, within the environment of FIG. 1, in accordance with an exemplary embodiment of the present invention.

Under the map-reduce framework, mappers work on each data split (i.e. distributed data source) separately, and each mapper passes local data and builds a local CF-tree. In process 305, each mapper program 115, respectively executing on computing device 110, 120, 130, and 140, accesses its corresponding data, i.e., data 192, 194, 196 and 198. In general, data that is generated by mapper program 115 or is received for processing by mapper program 115 is stored as part of a data file, e.g., data 192, 194, 196 and 198, respectively.

Each mapper program 115, respectively builds local CF-trees using the accessed data, in process 310. A CF-tree is a height-balanced tree where each node contains a number of entries. Each entry of the CF-tree corresponds to a number of data records and contains CF (cluster feature) summary. Cluster features include the number of records, mean and variance of each continuous variable, and counts for each category of each categorical variable. Leaf entries (entries in the leaf nodes of the CF-tree) represent sub-clusters. The non-leaf nodes and their entries are used to guide a new record into a correct leaf node.

A sequential clustering approach is used to build the CF-tree. Mapper program 115 uses a sequential clustering approach to scan the records one by one and determine if the current record should be merged with the previously formed sub-clusters or if a new sub-cluster should be created based on a distance criterion. Mapper program 115 creates a new sub-cluster if the distance between the current record being processed and the previously formed sub-clusters exceeds a threshold. For example, the distance between the current record being processed and the previously formed sub-clusters exceeds a threshold. As a result, the current record is not merged with the previously formed sub-clusters. Instead a new sub-cluster is formed that includes the current record.

The output of each mapper is in the form of <key, value>, where the value is the built CF-tree and the key is a randomly assigned integer between 1 and the number of reducers, i.e., the number of instances of reducer program 155 that are used to process the generated CF-trees. The resulting subset of CF-trees with the same key is then passed to a respective reducer program 155, in process 315, and stored as part of CF-tree data 156 and 157 respectively. For example, computing device 110 and 120 send their respective resulting subset of CF-trees, with the same key, to computing device 150, which subsequently stores the received data as part of CF-tree data 156.

The number of reducers is determined according to a strategy of balancing accuracy and performance under the given computing resources. For example, in the case that there are a large number of data splits, one strategy is to assign the same key to as many CF-trees as can be handled efficiently by a single reducer. Otherwise, a unique key for each CF-tree is assigned such that there are enough sets of selected variables in the final ensemble. In exemplary embodiments, multiple reducers are employed to maximize the parallel calculations, and each reducer is responsible for a subset of CF-trees with the same key.

Each respective reducer program 155 performs a wrapper model method using the subset of CF-trees with the same key that are received from mapper program 115 (instead of individual data records). In this way, raw data is passed only once. Moreover, the wrapper model method can run more efficiently since CF-trees are relatively small. Embodiments of the present invention utilize a comprehensive method to remove the least important variables in the sequential backward variable selection.

The operational processes of reducer program 155 yield a comprehensive method involving iterative steps of building the hierarchical clustering solution, computing a goodness measure of the solution, calculating variable importance, and removing the least important variables. The same subset of CF-trees is used in every iteration and only the variables become different.

For each subset of CF-trees with the same key, the following processes, are performed:

In process 320, each reducer program 155 accesses its CF-tree data, e.g., CF-tree data 156 and 157, respectively and selects all variables used for generating the CF-trees and sets the goodness measure at the minimal possible value. In general, data that is generated by reducer program 155 or is received for processing by reducer program 155 is stored as part of a CF-tree or its related files, e.g., data included as part of CF-tree data 156 and 157, respectively.

In process 325, reducer program 155 performs hierarchical agglomerative clustering with selected variables on the leaf entries of the involved CF-trees to generate an approximate clustering solution. Hierarchical agglomerative clustering is an iterative process where the closest two sub-clusters are merged in each step.

In process 330, reducer program 155 computes a goodness measure for the approximate clustering solution. In decision process 335, reducer program 155 determines whether the goodness measure is improved. If the goodness measure is improved (decision process, 335, yes branch), then reducer program 155 computes variable importance for the set of selected variables, in process 340. Variable importance indicates how influential a variable is in building the clustering solution, and it can be defined by several approaches, for example using hypothesis tests, or considering the contribution of each variable to the information criteria, e.g. Bayesian Information Criterion (BIC) and Akaike Information Criterion (AIC). The latter approach is consistent with the criteria for automatically determining the number of clusters in the solution In process 345, reducer program 155 discards the most unimportant variables, i.e., the variables with the lowest variable importance. Reducer program 155 returns to process 325. If the goodness measure is not improved (decision process, 335, no branch), then reducer program 155 proceeds to process 350.

In process 350, reducer program 155 selects the set of variables with the maximal goodness. In principle, the goodness measure of a clustering solution can be any measures used to determine goodness such as scatter separability, maximum likelihood, etc. In this embodiment, given that hierarchical clustering starts with leaf-entries, i.e. small sub-clusters, a new goodness measure is herein used and defined as the weighted average Silhouette coefficient over all starting sub-clusters. The average Silhouette coefficient ranges between −1 (indicating a very poor model) and +1 (indicating an excellent model). This measure avoids bias of variable selection criteria with respect to the number of variables.

In process 355, each respective reducer program 155 passes its output to controller program 175, which saves the output as part of cluster analysis 176. The output of each reducer includes a set of variables that corresponds to the maximal goodness, which is locally optimal. In general, data that is generated by controller program 175 or is received for processing by controller program 175 is stored as part of a cluster analysis, e.g., data included in cluster analysis 176.

In the previous exemplary embodiment, in the processes of sequential backward variable selection, the most unimportant variable is removed iteratively until the clustering quality is decreased. However, if the number of clusters is determined automatically, then a more aggressive strategy can be used to remove unimportant variables. This assumes that variables with a smaller number of optimal clusters would be less important. This strategy takes into account the need for finding the number of clusters in conjunction with variable selection.

As such, in certain embodiments, the number of clusters is determined automatically. To clarify for understanding, the following scenario will be used: suppose there are J* final clusters. In such embodiments, processes 325, 330 and 345 are repeated to discard the most unimportant variables until the optimal number of clusters is determined by the remaining variables being less than J*.

Controller program 175 collects candidate sets of variables produced by each of the reducers, i.e., the instances of reducer program 155, in process 360. Several methods can be utilized by Controller program 175 to combine the collected sets of variables. For example, one such method selects the set of variables with the maximum goodness value. However, this method remains unstable in terms of the overall clustering solution quality.

In this exemplary embodiment, in process 365, controller program 175 selects a stable and robust set of variables that produces an overall quality clustering solution based on each variable's respective frequency of appearance among candidate sets of variables produced by the reducers. For example, controller program 175 discards any variables with frequency of occurrence among the candidate variable sets less than a threshold, e.g., 50%. This approach effectively removes irrelevant or noise variables since it is not possible for such variables to appear frequently under the given framework.

This ensemble-based approach is also scalable and efficient since it allows parallel computation in reducers that perform the computationally demanding tasks of selecting the candidate sets of variables based on the local CF-trees and hierarchical clustering.

Figure 4:
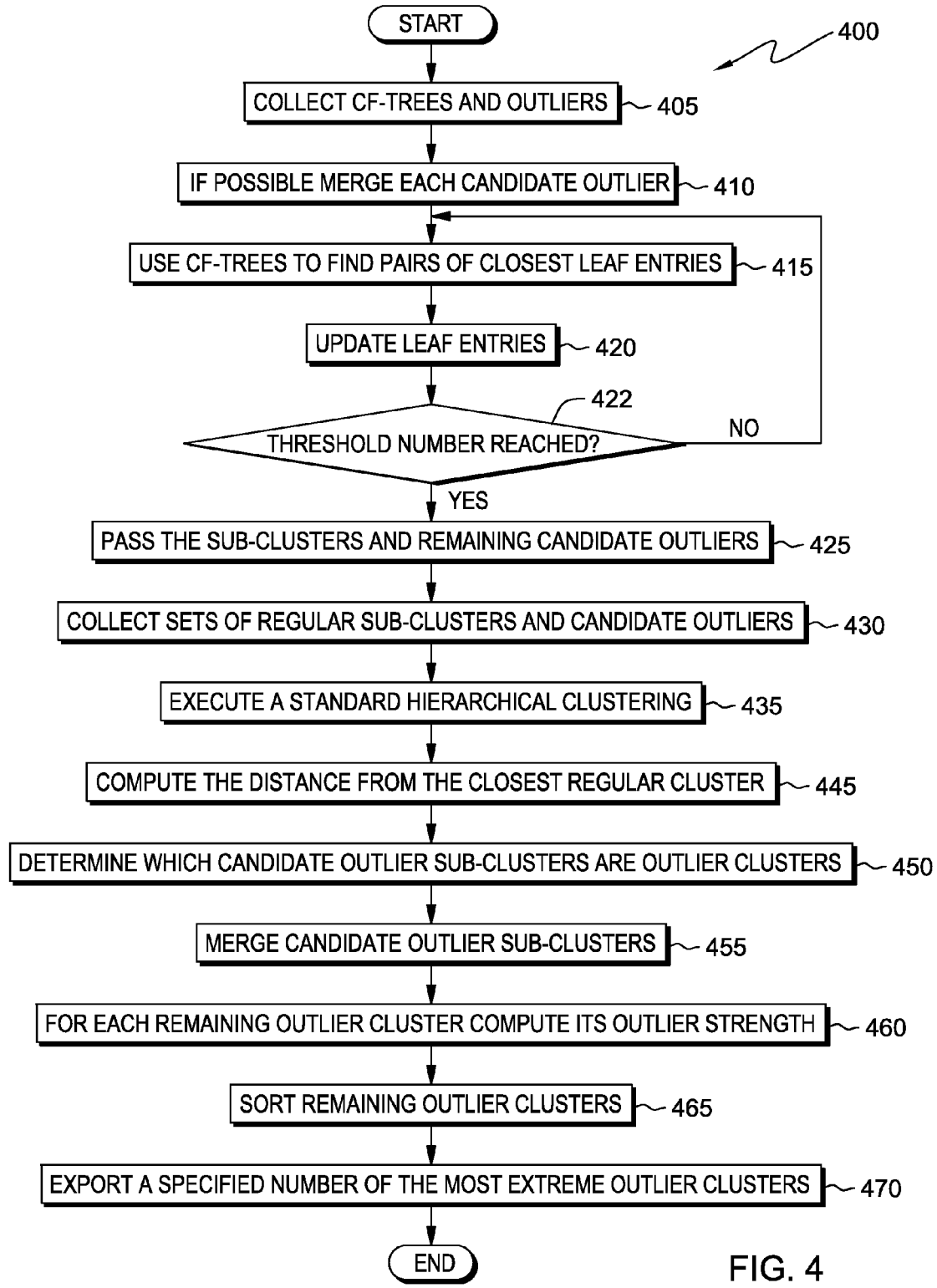
FIG. 4 illustrates operational processes of a method for outlier determination, in accordance with an exemplary embodiment of the present invention.

FIG. 4 illustrates a flowchart, 400, illustrating a method of outlier determination, based on operational processes of mapper program 115, reducer program 155, and controller program 175 respectively executing on computing devices 110, 120, 130, 140, 150, 160 and 170, within the environment of FIG. 1, in accordance with an exemplary embodiment of the present invention.

In contrast to the clustering described in the discussion of FIG. 3, in FIG. 4 a partial clustering is performed by the respective processes of mapper program 115 and reducer program 155. To generate a partial clustering solution mapper program 115 and reducer program 155 stop the clustering process when the number of sub-clusters reaches a given threshold. The resulting sub-clusters are then joined with resulting sub-clusters from other reducer tasks and the process of hierarchical clustering continues producing the overall clustering solution. Partial clustering is applied when collecting partial clustering results from reducers into the controller to generate an overall solution. However, it could, in some cases, also be applied to adaptive feature selection, described in the discussion of FIG. 3, within each reducer, but usually each reducer there would be capable of generating its solution as a single task without requiring partial clustering.

In FIG. 4, in addition to the processing described in FIG. 3, which is hereafter modified for partial clustering, the following processes are performed, for each reducer task corresponding to a single key, to identify outliers:

In process 405, reducer program 155 collects all CF-trees and outliers with the same key under consideration.

In process 410, reducer program 155 merges candidate outliers into CF Trees, if possible. Reducer program 155 merges each candidate outlier with the closest regular leaf entry. Such a merging is only deemed possible if the merging does not break the maximal tightness threshold among the involved CF-trees. The closest regular leaf entry is determined by passing the CF-trees. In processes 415, 420 and 422 reducer program 155 performs CF-tree based hierarchical clustering on the leaf entries, and generates a number of sub-clusters specified by the threshold.

In process 415, reducer program 155 uses CF-trees to find pairs of closest leaf entries. While this process is applied to multiple CF-trees, not all pairs of leaves are compared.

To find the closest pair of CF tree leaf entries, reducer program 155 passes the involved CF-trees separately from their root node, and each of them provides a candidate closest leaf entry. Then, the true closest leaf entry is selected from the candidates. Such an approach is used in place of a comparison of all pairs of leaf entries, thus yielding only a few comparisons per CF-tree. An ordering of CF-trees further reduces the number of comparisons. As such, for a given leaf entry in the current CF-tree, only the current and subsequent CF-trees are searched for closest leaf entries.

In step 420, once the closest pair of leaf entries is chosen, reducer program 155 updates the leaf entry that belongs to the first CF-tree, i.e., merges the leaf entries. If the leaf entries in the pair belong to the same CF-tree, then the one with larger size is updated. The updated leaf entry accounts for all data cases in the former pair of entries while the other leaf entry is discarded. Thus, the number of leaf entries is reduced by one at each clustering step. Meanwhile, the involved CF-trees are updated accordingly to reflect the merging. In general, processes 415 and 420 are repeated until a threshold number of leaf entries is reached, and returns the set of updated CF-trees, whose leaf entries indicate the produced sub-clusters.

In decision process 422, reducer program 155 determines if the threshold number of leaf entries has been reached. If the threshold number of leaf entries has been reached (decision process 422, YES branch), then reducer program 155 proceeds to process 425. If the threshold number of leaf entries has not been reached (decision process 422, NO branch), then reducer program 155 proceeds to process 415.

The output of each reducer task consists of the set of sub-clusters and candidate outliers. If the number of original reducer tasks is very large, then the output can become overwhelming for the final clustering operation in the controller. In such a case, multiple tasks may be processed by a single reducer and the joined results from the original tasks further reduced by another round of partial hierarchical clustering before sending the output to the controller.

In process 425, reducer program 155 passes the sub-clusters and remaining candidate outliers to the controller, i.e., controller program 175.

In process 430, controller program 175 collects all the sets of regular sub-clusters and candidate outliers produced by reducers. Notice that outliers here actually contain summaries of sets of data records and are therefore sub-clusters. In previous sections, the term sub-clusters referred to regular sub-clusters, but in this section, regular sub-clusters will be distinguished from outlier sub-clusters.

In process 435, controller program 175 executes a standard hierarchical clustering starting with regular sub-clusters to generate initial regular clusters. The number of regular clusters can be determined automatically or by using a fixed number depending on the embodiment.

In processes 445 and beyond, controller program 175 determines a measure of outlier strength for candidate outlier sub-clusters. The outlier strength is defined for an outlier sub-cluster (s) as the expected ratio of its distance from a regular cluster (j) to the distance threshold of the cluster (j), that is:

$$O(s) = \sum_{j=1}^{J} \frac{d(j, s)}{D_t(j)} p(j \mid s)$$

Where J is the number of regular clusters, d(j, s) is the distance from a regular cluster j to the center of the sub-cluster s and $D_t(j)$ is the distance threshold of regular cluster j. Since only the cluster features of sub-clusters, rather than original data records are available in the controller, the distance threshold $D_t(j)$ is estimated as the maximum distance from cluster j to each center of the corresponding starting sub-clusters in the hierarchical clustering.

The probability of sub-cluster s belonging to cluster j, p(j|s), is defined as:

$$p(j|s) = \frac{\exp(-d(j,s))}{\sum_{j=1}^{j} \exp(-d(j,s))}$$

In process 445, controller program 175 computes the distance from the closest regular cluster for each remaining candidate outlier sub-cluster.

In process 450, controller program 175 determines which candidate outlier sub-clusters are outlier clusters. Controller program 175 bases this determination on which candidate outlier sub-clusters have a computed distance greater than the corresponding distance threshold of the closest regular cluster. For example, if candidate outlier sub-cluster (A) has a computed distance greater than the corresponding distance threshold of the closest regular cluster, then controller program 175 determines that candidate outlier sub-cluster (A) is an outlier cluster.

In process 455, controller program 175 merges the rest of candidate outlier sub-clusters with the corresponding closest regular clusters and updates the distance threshold for each regular cluster.

In process 460, for each remaining outlier cluster, controller program 175 computes its outlier strength.

In process 465, controller program 175 sorts remaining outlier clusters according to outlier strength, in descending order, and determines the minimum outlier strength for the top P (e.g., default 5%) percent of outliers. The minimum outlier strength can be used as an outlier threshold for scoring purposes.

In process 470, controller program 175 generates a specified number of the most extreme outlier clusters (e.g., default 20), along with the following measures for each cluster: cluster size, outlier strength, probabilities of belonging to each regular cluster, etc. The specified number of the most extreme outlier clusters along with the sorted remaining outlier clusters and the minimum outlier strength are all saved as part of cluster analysis 176.

In certain embodiments, the outlier threshold obtained in process 465 is used for detection of outlier records rather than sub-clusters. In such embodiments, a new data pass is applied and outlier strength is computed for each record using the same formula as for the outlier sub-cluster. The records with outlier strength above the computed threshold are the outlier records.

III. Further Comments and Embodiments

Various embodiments and comments, in accordance with the present invention, are disclosed herein. These embodiments and comments are provided for purposes of illustration only, and are not intended to limit the scope of the invention. Those skilled in the art will readily appreciate that the present invention may be implemented in various forms, and that modifications, additions, and substitutions are possible without departing from the spirit and scope of the invention as set forth in the appended claims.

In the following portion of this document, the two-step clustering method is extended into the distributed setting, specifically under the map-reduce framework. In addition to generating a clustering solution, mechanisms for selecting the most relevant features for clustering given data are provided, as well as detecting rare outlier points. Moreover, an enhanced set of evaluation and diagnostic features enabling insight, interactivity, and an improved overall user experience are provided.

Some embodiments of the present invention may include one, or more, of the following assumptions: 1) to create CF-trees efficiently, assume that operations within a main memory environment (e.g. RAM) is efficient, and the size of the main memory can be allocated or controlled by a user, and 2) assume that the data is randomly partitioned. (Note: If this assumption is not allowed, sequential partition can still be applied. But notice that the clustering result would be possibly impacted, particularly if the data is ordered in some special way.)

Notations:

The following table of notations, included in TABLE 1, are used throughout the document unless otherwise stated:

TABLE 1

| | |
|---|---|
| R | Number of data partitions/splits. |
| $N_j$ | Number of cases in cluster $C_j$. |
| $N_{jk}$ | Number of cases in cluster $C_j$ which have non-missing values in the kth feature. |
| K | Number of features used for clustering. |
| $x_i = (x_{i1}, \ldots, x_{iK})$ | The ith data case. $x_i$ is a K-dimensional vector. |
| $x_{ik}^A$, k = 1, ..., $K^A$ | Value of the kth continuous feature of the ith data case $x_i$. There are $K^A$ number of continuous features. |
| $x_{ik}^B$, k = 1, ..., $K^B$ | Value of the kth categorical feature of the ith data case $x_i$. There are $K^B$ number of categorical features. |
| $L_k$, k = 1, ..., $K^B$ | Number of categories of the kth categorical feature in the entire data. |
| $N_{jkl}$, k = 1, ..., $K^B$, l = 1, ..., $L_k$ | Number of cases in cluster $C_j$ whose kth categorical feature takes the lth category. |
| $s_{jk}$, k = 1, ..., $K^A$ | Sum of values of the kth continuous feature in cluster $C_j$. |
| $s_{jk}^2$, k = 1, ..., $K^A$ | Sum of squared values of the kth continuous feature in cluster $C_j$. |
| d (j, s) | Distance between clusters $C_j$ and $C_s$. |
| $C_{<j,s>}$ | Cluster formed by combining clusters $C_j$ and $C_s$. |

Data Pre-Processing:

In some cases, data pre-processing includes one or more of the following transformations: a) Trailing blanks are trimmed b) Date/time features are transformed into continuous ones, c) normalization of continuous features, d) category values of a categorical feature are mapped into integers. (As such, the expression "$x_{ik}^B=l$" indicates that the kth categorical feature of the ith case takes the lth category), e)

system/user missing and invalid values are all considered as missing, and f) cases with missing values in all features are discarded.

Data and Measures:

Let $x_i$ be the ith data case. Denote $I_j$ as the index set of cluster $C_j$, $I_j = \{i: x_i \in C_j\}$. Let $K = K^A + K^B$ be the total number of features in which $K^A$ of them are continuous and $K^B$ are categorical. Without loss of generality, write $x_i$ as given by equation (1) as follows:

$$x_i = (x_{i1}, \ldots, x_{iK}) = (x_{i1}^A, \ldots, x_{iK^A}^A, x_{i1}^B, \ldots, x_{iK^B}^B)$$

Where $x_{ik}^A$ is the value of the kth continuous feature, $k = 1, \ldots, K^A$, and $x_{ik}^B$ is the value of the kth categorical feature, $k = 1, \ldots, K^B$. Express $x_{ik}^B$ as a vector $(x_{ik1}^B, \ldots, x_{ikL_k}^B)$ of $L_k$ values in which each entry is either zero or one, e.g., as given by equation (2) as follows:

$$x_{ikl}^B = \begin{cases} 1, & \text{if } x_{ik}^B \text{ takes the } l\text{th category} \\ 0, & \text{otherwise} \end{cases}$$

Cluster Feature of a Cluster:

The cluster feature (sufficient statistics set) $CF_j$ of a cluster $C_j$ is a collection of statistics that summarizes the characteristics of a cluster. A possible set $CF_j$ is given by equation (3) as follows:

$$CF_j = \{N_j, \vec{N}_j, s_j, s_j^2, N_j^B\}$$

Where $N_j$ is the number of data cases in cluster:

$$C_j, \vec{N}_j = (N_{jk}, \ldots, N_{jK^A}, N'_{j1}, \ldots, N'_{jK^B})$$

is a K-dimensional vector; the kth entry is the number of data cases in cluster $C_j$ which have non-missing values in the kth feature. $s_j = (s_{j1}, \ldots, s_{jK^A})$ is a $K^A$-dimensional vector; the kth entry is the sum of the non-missing values of the kth continuous feature in cluster $C_j$, e.g., as given by equation (4) as follows:

$$S_{jk} = \Sigma_{i \in I_j} x_{ik}^A$$

For $k = 1, \ldots, K^A$. Similarly, $s_j^2 = (s_{j1}^2, \ldots, s_{jK^A}^2)$ is a $K^A$-dimensional vector such that the kth entry is the sum of squared non-missing values of the kth continuous feature in cluster $C_j$, e.g., as given by equation (5) as follows:

$$s_{jk}^2 = \Sigma_{i \in I_j} (x_{ik}^A)^2$$

for $k = 1, \ldots, K^A$

Similarly, $N_j^B = (N_{j1}^B, \ldots, N_{jK^B}^B)$ is a $\Sigma_{k=1}^{K^B}(L_k-1)$-dimensional vector where the kth sub-vector $N_{jk}^B$ is $(L_k-1)$ dimensional, e.g., as given by equation (6) as follows:

$$N_{jk}^B = (N_{jk1}, \ldots, N_{jk(L_k-1)})$$

For $k = 1, \ldots, K^B$. The lth entry $N_{jkl}$ represents the total number of cases in cluster $C_j$ whose kth categorical feature takes the lth category, $l = 1, \ldots, L_k-1$, e.g., as given by equation (7) as follows:

$$N_{jkl} = \Sigma_{i \in I_j} x_{ikl}^B$$

Updating Cluster Feature when Merging Two Clusters:

When two clusters $C_j$ and $C_s$ are said to merge, it simply means that the two corresponding sets of data points are merged together to form a union. In this case, the $CF_{<j,s>}$ for the merged cluster $C_{<j,s>}$ can be calculated by simply adding the corresponding elements in $CF_j$ and $CF_s$, e.g., as given by equation (8) as follows:

$$CF_{<j,s>} = \{N_j + N_s, \vec{N}_j + \vec{N}_s, s_j + s_s, s_j^2 + s_s^2, N_j^B + N_s^B\}$$

Tightness of a Cluster:

The interpretation of tightness of a cluster is that the smaller the value of tightness, the less variation of the data cases within the cluster. There are two tightness measures, and they will be used depending on the specified distance measure, log-likelihood distance or Euclidean distance.

Tightness Based on Log-Likelihood Distance:

The tightness $\tilde{\eta}_j$ of a cluster $C_j$ can be defined as average negative log-likelihood function of the cluster evaluated at the maximum likelihood estimates of the model parameters, e.g., a tightness $\tilde{\eta}_j$ of a cluster $C_j$ is given by equation (9) as follows:

$$\hat{\eta}_j = \frac{1}{2} \sum_{k=1}^{K^A} \ln\left(1 + \frac{\hat{\sigma}_{jk}^2}{\Delta_k}\right) + \sum_{k=1}^{K^B} \hat{E}_{jk}$$

Where $\hat{\sigma}_{jk}^2$ is the maximum likelihood variance estimate of the kth continuous feature in cluster $C_j$ and is given by equation (10) as follows:

$$\hat{\sigma}_{jk}^2 = \frac{s_{jk}^2 - N_{jk}(\hat{\mu}_{jk})^2}{N_{jk}}$$

In which $\hat{\mu}_{jk}$ is the sample mean, as given by equation (11) as follows:

$$\hat{\mu}_{jk} = \frac{s_{jk}}{N_{jk}}$$

$\hat{E}_{jk}$ is the entropy of the kth categorical feature in cluster $C_j$, as given by equation (12) as follows:

$$\hat{E}_{jk} = -\Sigma_{l=1}^{L_k} \hat{q}_{jkl} \ln \hat{q}_{jkl}$$

In which $\hat{q}_{jkl}$ is the portion of data cases in cluster $C_j$ whose kth categorical feature takes the lth category, as is given by equation (13) as follows:

$$\hat{q}_{jkl} = \frac{N_{jkl}}{N'_{jk}}$$

Finally, $\Delta_k$ is appositive scalar which is added to handle the degenerating conditions and balance the contributions between a continuous feature and a categorical one. The default value of $\Delta_k$ is 1/6. To handle missing values, the definition of tightness assumes that the distribution of missing values is the same as for the observed non-missing points in the cluster. Moreover, the following assumption, given by equation (14) as follows, is always applied:

$$x \ln(x) = 0, \text{ if } x = 0 \qquad \text{(equation 14)}$$

Tightness Based on Euclidean Distance:

The tightness $\tilde{\eta}_j$ of a cluster $C_j$ can be defined as the average Euclidean distance from member cases to the center/centroid of the cluster. A tightness $\tilde{\eta}_j$ of a cluster $C_j$ is given by equation (15) as follows:

$$\tilde{\eta}_j = \sqrt{\sum_{k=1}^{K} \frac{s_{jk}^2 - N_{jk}(\hat{\mu}_{jk})^2}{N_{jk}}}$$

Notice that if any feature in cluster $C_j$ has all missing values, the feature will not be used in the computation.

Distance Measures Between Two Clusters:

Suppose clusters $C_j$ and $C_s$ are merged to form a new cluster $C_{\langle j,s \rangle}$ that consists of the union of all data cases in $C_j$ and $C_s$. Two distance measures are available.

Log-Likelihood Distance:

The distance between $C_j$ and $C_s$ can be captured by observing the corresponding decrease in log-likelihood as the result of combining $C_j$ and $C_s$ to form $C_{\langle j,s \rangle}$. The distance measure, $d(j, s)$, between two clusters $C_j$ and $C_s$ is given by equation (16) as follows:

$$d(j,s) = \sum_{k=1}^{K^A + K^B} d_k(j,s) = \tilde{\xi}_j + \tilde{\xi}_s - \tilde{\xi}_{\langle j,s \rangle}$$

Where equation (17) is as follows:

$$\tilde{\xi}_j = -\frac{1}{2}\sum_{k=1}^{K^A} N_{jk}\ln(\hat{\sigma}_{jk}^2 + \Delta_k) - \sum_{k=1}^{K^B} N'_{jk}\hat{E}_{jk}$$

and equation (18) is as follows:

$$d_k(j,s) = \begin{cases} \{-N_{jk}\ln(\hat{\sigma}_{jk}^2 + \Delta_k) - N_{sk}\ln(\hat{\sigma}_{sk}^2 + \Delta_k) + N_{\langle j,s \rangle k}\ln(\hat{\sigma}_{\langle j,s \rangle k}^2 + \Delta_k)\}/2, & \text{if feature } k \text{ is continuous} \\ -N'_{jk}\hat{E}_{jk} - N'_{sk}\hat{E}_{sk} + N'_{\langle j,s \rangle k}\hat{E}_{\langle j,s \rangle k}, & \text{if feature } k \text{ is categorical} \end{cases}$$

Note that since $\tilde{\xi}_{\langle j,s \rangle}$ can be calculated by using the statistics in $CF_{\langle j,s \rangle}$, the distance can be calculated by first updating the $CF_{\langle j,s \rangle}$ of the merged cluster $C_{\langle j,s \rangle}$. To handle missing values, the definition of distance assumes that the contribution of missing values equals zero.

The Euclidean distance can only be applied if all features are continuous. The distance between two cases is clearly defined. The distance between two clusters is here defined by the Euclidean distance between the two cluster centers. A cluster center is defined as the vector of cluster means of each feature. If the centers/centroids of clusters $C_j$ and $C_s$ are $(\hat{\mu}_{j1}, \ldots, \hat{\mu}_{jK})$ and $(\hat{\mu}_{s1}, \ldots, \hat{\mu}_{sK})$ respectively, then equation (19) gives $d(j, s)$ as:

$$d(j,s) = \sqrt{\sum_{k=1}^{K} d_k^2(j,s)} = \sqrt{\sum_{k=1}^{K} (\hat{\mu}_{jk} - \hat{\mu}_{sk})^2}$$

Where $d_k(j,s)$ is defined by equation 20 as:

$$d_k(j,s) = |\hat{\mu}_{jk} - \hat{\mu}_{sk}|$$

Again, any feature in cluster $C_j$ with all missing values will not be used in the computation.

CF-Tree Building:

A CF-tree is a very compact summary of dataset in the way that each entry (leaf entry) in the leaf node is a sub-cluster, which absorbs the data cases that are close together, as measured by the tightness index $\eta$ and controlled by a specific threshold value T. The CF-tree is built dynamically as new data case is inserted, it is used to guide to a new insertion into the correct sub-cluster for clustering purpose. The CF-tree is a height-balanced tree with four parameters: 1) the branching factor B for the non-leaf nodes, (The branching factor B is the maximum number of entries that a non-leaf node can hold. A non-leaf entry is of the form [$CF_i$, $child_i$], i=1, ..., B, in which $child_i$ is a pointer to its ith child node and $CF_i$ is the cluster feature of the sub-cluster represented by this child.); 2) the branching factor L for the leaf nodes, (The branching factor L is the maximum number of entries that a leaf node can hold. A leaf entry is similar to a non-leaf entry except that is does not have a pointer. It is of the form [$CF_i$], i=1, ..., L); 3) The threshold parameter T that controls the tightness $\eta$ of any leaf entries, (That is, all leaf entries in a leaf node must satisfy a threshold requirement that the tightness has to be less than T, i.e. $\tilde{\eta} \leq T$); and 4) Maximum tree height H. In addition, each leaf node has two pointers: "prev" and "next" which are used to chain all leaf nodes together for efficient scanning.

Inserting a Single Case or a Sub-Cluster into a CF-Tree:

The procedure for inserting a data case or a sub-cluster (abbrev. "Ent") into a CF-tree is as follows:

Identify the appropriate leaf node. Starting from the root node, recursively descend the CF-tree by choosing the closest child node according to the distance measure d.

Modify the leaf node. Upon reaching a leaf node, find the closest leaf entry [$CF_i$], say, and see if Ent can be absorbed into [$CF_i$] without violating the threshold requirement $\tilde{\eta} \leq T$. If so, update the CF information in [$CF_i$] to reflect the absorbing action. If not, add a new entry for Ent to the leaf. If there is space on the leaf for this new entry to fit in, then the modification is completed upon entry of Ent to the leaf. Otherwise, split the leaf node by choosing the farthest pair of entries as seeds, and redistribute the remaining entries based on the closest criteria.

Modify the path to the leaf node. After inserting Ent into a leaf node, update the CF information for each non-leaf entry on the path to the leaf node. If there is no leaf split, then only the corresponding CF information is needed to update to reflect the absorbing of Ent. If a leaf split happens, then it is necessary to insert a new non-leaf entry into the parent node in order to describe the newly created leaf. If the parent has space for this entry, at all higher levels, only the CF information is needed to update to reflect the absorbing of Ent. In general, however, the parent node has to split as well, and so on up to the root node. If the root node is split, the tree height increases by one.

Notice that the growth of CF-tree is sensitive to case order. If the same data case is inserted twice but at different time, the two copies might be entered into two distinct leaf entries. It is possible that two sub-clusters that should be in one cluster are split across nodes. Similarly, it is also possible that two sub-clusters that should not be in one cluster are kept together in the same node.

Threshold Heuristic:

In building the CF-tree, the algorithm starts with an initial threshold value (default is 0). Then the algorithm scans the data cases and inserts into the tree. If the main memory runs out before data scanning is finished, then the threshold value is increased to rebuild a new smaller CF-tree, by re-inserting the leaf entries of the old tree into the new one. After the old leaf entries have been re-inserted, data scanning is resumed from the case at which it was interrupted. The following strategy is used to update the threshold values.

Suppose that at step i, the CF-tree of the threshold $T_i$ is too big for the main memory after $N_i$ data cases in the data have been scanned, an estimate of the next (larger) threshold $T_{i+1}$ is needed to rebuild a new smaller CF-tree. In certain embodiments, the next threshold $T_{i+1}$ is estimated so that $N_{i+1}=\min(2N_i, N)$, where N is the total number of data cases in the data. That is, whether N is known, estimate the next threshold $T_{i+1}$ at most in proportion to the data that have been scanned so far.

A very simple way to estimate $T_{i+1}$ is to use equation 21 as follows:

$$\hat{T}_{i+1} = \frac{N_{i+1}}{N_i} T_i$$

Another way to estimate $T_{i+1}$ is to take the next threshold value $T_{i+1}$ such that it is at least greater than the tightness $\tilde{\eta}$ of the union of the two closest entries in the tree. However, searching the closest entries can be tedious. Utilizing a heuristic, e.g., BIRCH's heuristic, traverse along a path from the root to the most crowded leaf that has the most entries and find the pair of leaf entries that is closest. Let $\tilde{\eta}_{min}$ be the tightness of the union of the closest pair.

Combine the above arguments together, and determine $T_{i+1}$ as follows in equation 22:

$$T_{i+1} = \begin{cases} \tilde{\eta}_{min}, & \text{if } \tilde{\eta}_{min} > T_i \\ \hat{T}_{i+1}, & \text{otherwise} \end{cases}$$

Rebuilding CF-Tree:

When the CF-tree size exceeds the size of the main memory, or the CF-tree height is larger than H, the CF-tree is rebuilt to a smaller one by increasing the tightness threshold. Assume that within each node of CF-tree $t_i$, the entries are labeled contiguously from 0 to $n_k-1$, where $n_k$ is the number of entries in that node. A path from an entry in the root (level 1) to a leaf node (level h) is uniquely represented by $(i_1, i_2, \ldots, i_{h-1})$, where $i_j, j=1, \ldots, h-1$, is the label of the jth level entry on that path. So naturally, path $(i_1^{(1)}, i_2^{(1)}, \ldots, i_{h-1}^{(1)})$ is before (or <) path, $(i_1^{(2)}, i_2^{(2)}, \ldots, i_{h-1}^{(2)})$ if $i_1^{(1)}=i_1^{(2)}, \ldots, i_{h-1}^{(1)}=i_{j-1}^{(2)}$, and $i_1^{(1)}<i_1^{(2)}$ for $0 \leq j \leq h-1$. It can thus be seen that each leaf node corresponds to a path, since this is a tree structure, the terms "path" and "leaf node" will be used interchangeably hereafter.

With the natural path order defined above, the algorithm scans and frees the old tree, path by path, and at the same time, creates the new tree path by path. The procedure is as follows:

Let the new tree start with NULL and OldCurrentPath be initially the leftmost path in the old tree.

Create the corresponding NewCurrentPath in the new tree: Copy the nodes along OldCurrentPath in the old tree into the new tree as the (current) rightmost path; call this NewCurrentPath.

Insert leaf entries in OldCurrentPath to the new tree: With the new threshold, each leaf entry in OldCurrentPath is tested against the new tree to see if it can either by absorbed by an existing leaf entry, or fit in as a new leaf entry without splitting, in the NewClosestPath that is found top-down with the closest criteria in the new tree. If yes and NewClosestPath is before NewCurrentPath, then it is inserted to NewClosestPath, and deleted from the leaf node in NewCurrentPath.

Free space in OldCurrentPath and NewCurrentPath: Once all leaf entries in OldCurrentPath are processed, the nodes along OldCurrentPath can be deleted from the old tree. It is also likely that some nodes along NewCurrentPath are empty because leaf entries that originally corresponded to this path have been "pushed forward". In this case, the empty nodes can be deleted from the new tree.

Process the next path in the old tree: OldCurrentPath is set to the next path in the old tree if there still exists one, and go to step 2.

Delayed-Split Option: If the CF-tree resulted by inserting a data case is too big for the main memory, it may be possible that some other data cases in the data can still fit in the current CF-tree without causing a split on any node in the CF-tree (thus the size of the current tree remains the same and can still be in the main memory). Similarly if the CF-tree resulted by inserting a data case exceeds the maximum height, it may be possible that some other data cases in the data can still fit in the current CF-tree without increasing the tree height.

Once either of the two conditions occur, such cases are written out to disk (with $S_1$ amount of disk space put aside for this purpose) and data scanning continues until the disk space runs out as well. The advantage of this approach is that more data cases can fit into the tree before a new tree is rebuilt.

Outlier-Handling Option:

Outlier is defined as leaf entry (sub-cluster) of low density, which contains less than $N_{min}$ (default 10) cases. Similar to the delayed-split option, some disk space $S_2$ is allocated for handling outliers. When the current CF-tree is too big for the main memory, some leaf entries are treated as potential outliers (based on the definition of outlier) and are written out to disk. The others are used to rebuild the CF-tree. FIG. 3 shows the control flow of the outlier-handling option.

Implementation notes: a) The CF-tree t1 should be updated once any leaf entry is written to disk space $S_2$. b) Outliers identified here are local candidates, and they are analyzed further in later steps, where the final outliers will be determined.

Overview of CF-Tree Building:

Initially a threshold value is set, data is scanned and the CF-tree is built dynamically. When the main memory runs out, or the tree height is larger than the maximum height before the whole data is scanned, the algorithm performs the delayed-split option, outlier-handling option and the tree rebuilding step to rebuild a new smaller CF-tree that can fit into the main memory. The process continues until all cases in the data are processed. When all data is scanned, cases in disk space $S_1$ and entries in disk space $S_2$ are scanned again to verify whether or not they are outliers.

Implementation note: When all data is scanned, all cases in disk space $S_1$ will be inserted into the tree if the option of outlier-handling is turned off. This may result in rebuilding the tree if necessary.

The following TABLE, 2, shows the parameters involved in CF-tree building and their default values.

TABLE 2

| Parameter | Default value |
| --- | --- |
| Assigned main memory (M) | 80*1024 bytes |
| Assigned disk space for outlier-handling ($S_2$) | 20% of M |
| Assigned disk space for delayed-split ($S_1$) | 10% of M |
| Adjustment constant to the tightness and distance measures, $\Delta_k, k = 1, \ldots, K^A$ | 1/6 |

TABLE 2-continued

| Parameter | Default value |
|---|---|
| Distance measure (Log-likelihood/Euclidean) | Log-likelihood |
| Initial threshold value (T) | 0 |
| Branching factor (B) | 8 |
| Branching factor (L) | 8 |
| Maximum tree height (H) | 3 |
| Delayed-split option (on/off) | On |
| Outlier-handling option (on/off) | On |
| Outlier definition ($N_{min}$) | Leaf entry which contains less than $N_{min}$ cases, default 10 | clusters $C_j$ and $C_s$ in the pair are closest together in terms of the distance measure d(j,s). A new cluster $C_{<j,s>}$ is formed to replace one of the clusters in the pair, say. This new cluster contains all data cases in $C_j$ and $C_s$. The other cluster $C_s$ is discarded. Hence the number of clusters is reduced by one at each step. The process stops when the desired number of clusters $J_1$ is reached. Since the distance measure between any two clusters that are not involved in the merge does not change, the algorithm is designed to update the distance measures between the new cluster and the other clusters efficiently.

An example of a procedure for matrix based HAC can be seen in TABLE 3, shown as follows:

TABLE 3

Step 1. For j = 1, ... , $J_0$ - 1, {
　Compute d(j, s) for s = j + 1, ... , $J_0$;

Find $\delta_j = \min_{s=j+1,...,J_0} (j, s)$ and $s_j = \arg\min_{s=j+1,...,J_0} d(j, s)$;

}

Find $\delta_* = \min_{j=1,...,J_0-1} \delta_j$ and $j_* = \arg\min_{j=1,...,J_0-1} \delta_j$, the closest pair is $\langle j_*, s_{j_*} \rangle$;

Step 2. For J = $J_0$ - 1, ... , $J_1$, }

Merge the closest pair $\langle j_*, s_{j_*} \rangle$, and replace $C_{j_*}$ by $C_{\langle j_*, s_{j_*} \rangle}$;

For j = 1, ... , $j_*$ - 1, {
　　If $s_j = s_{j_*}$, recompute all distances d(j, s), s = j + 1, ... , J, and update $\delta_j$ and $s_j$;
　　If $s_j \neq s_{j_*}$, {
　　　Compute d = d(j, $j_*$);
　　　If d < $\delta_j$, update $\delta_j$ = d and $s_j$ = $j_*$;
　　　If d = $\delta_j$, no change;
　　　If d > $\delta_j$ and $s_j$ = $j_*$,
　　　　Recompute all distances d(j, s), s = j + 1, ... , J, and update $\delta_j$ and $s_j$;
　　　If d > $\delta_j$ and $s_j \neq j_*$, no change;
　　}
　}
　For j = $j_*$, recompute all distances d(j, s), s = j + 1, ... , J, and update $\delta_j$ and $s_j$;
　For j = $j_*$ + 1, ... , $s_{j_*}$ -1, {
　　If $s_j = s_{j_*}$, recompute all distances d(j, s), s = j + 1, ... , J, and update $\delta_j$ and $s_j$;
　　If $s_j \neq s_{j_*}$, no change;
　}
　For j = $s_{j_*}$ + 1, ... , J, no change;

Erase $C_{s_{j_*}}$;

Find $\delta_* = \min_{j=1,...,J} \delta_j$ and $j_* = \arg\min_{j=1,...,J} \delta_j$, the closest pair is $\langle j_*, s_{j_*} \rangle$;

}

Hierarchical Agglomerative Clustering:

Hierarchical Agglomerative Clustering (HAC) proceeds by steps producing a sequence of partitions in which each partition is nested into the next partition in the sequence. HAC can be implemented using two methods, as described below.

Matrix Based HAC:

Suppose that matrix based HAC starts with $J_0$ clusters. At each subsequent step, a pair of clusters is chosen. The two Implementation notes: In order to reduce the memory requirement, it is not necessary to create an actual distance matrix when determining the closest clusters.

CF-Tree Based HAC:

Suppose that CF-tree based HAC starts with $K_0$ CF-trees $T_{CF}^k$=1, . . . , $K_0$ which contain $J_0$ leaf entries $C_i$, i=1, . . . , $J_0$. Let $l(C_i)$ be the index of the CF-tree which contains the leaf entry $C_i$. For convenience, suppose $C_s > C_j$ if $l(C_s) > l(C_j)$. At each subsequent step, a pair of leaf entries is chosen. The two leaf entries $C_j$ and $C_s$ in the pair are closest together in terms of the distance measure d(j, s). A new leaf entry $C_{<j,s>}$ is formed to replace one of the leaf entries in the pair, say $C_j$, is created. This new leaf entry contains all data cases in $C_j$ and $C_s$. The other leaf entry $C_s$ is discarded. Hence, the number of leaf entries is reduced by one at each step. Meanwhile, the involved CF-trees are updated accordingly. The process stops when the desired number of leaf entries $J_1$ is reached. The output is the set of updated CF-trees, whose leaf entries indicate the produced clusters.

An example of a procedure for CF-tree based HAC can be seen in TABLE 4, shown as follows:

TABLE 4

Step 1. For $j = 1, \ldots, J_0 - 1$, {
  Find the closest leaf entry $C_{s^k}$ in each CF-tree $T_{CF}^k$ for $k = l(C_j), \ldots, K_0$, following the involved tree structure;

Find $\delta_j = \min\limits_{s^k > j, k = l(C_j), \ldots, K_0} d(j, s^k)$ and $s_j = \arg\min\limits_{s^k > j, k = l(C_j), \ldots, K_0} d(j, s^k)$;

}

Find $\delta_* = \min\limits_{j=1,\ldots,J_0-1} \delta_j$ and $j_* = \arg\min\limits_{j=1,\ldots,J_0-1} \delta_j$, the closest pair is $\langle j_*, s_{j_*} \rangle$;

Step 2. For $J = J_0 - 1, \ldots, J_1$, {

Merge the closest pair $\langle j_*, s_{j_*} \rangle$, update CF-tree $T_{CF}^{l(C_{j_*})}$ by the new leaf entry $C_{(j_*, s_{j_*})}$, and remove the leaf entry $C_{s_{j_*}}$ from CF-tree $T_{CF}^{l(C_{s_{j_*}})}$;

For $j = 1, \ldots, j_* - 1$, {
    If $s_j = s_{j_*}$, {
      Find the closest leaf entry $C_{s^k}$ in each CF-tree $T_{CF}^k$ for $k = l(C_j), \ldots, K_0$;

Find $\delta_j = \min\limits_{s^k > j, k = l(C_j), \ldots, K_0} d(j, s^k)$ and $s_j = \arg\min\limits_{s^k > j, k = l(C_j), \ldots, K_0} d(j, s^k)$;

}
    If $s_j \neq s_{j_*}$, {
      Compute $d = d(j, j_*)$;
      If $d < \delta_j$, update $\delta_j = d$ and $s_j = j_*$;
      If $d = \delta_j$, no change;
    If $d > \delta_j$ and $s_j = j_*$, {
      Find the closest leaf entry $C_{s^k}$ in each CF-tree $T_{CF}^k$ for $k = l(C_j), \ldots, K_0$;

Find $\delta_j = \min\limits_{s^k > j, k = l(C_j), \ldots, K_0} d(j, s^k)$ and $s_j = \arg\min\limits_{s^k > j, k = l(C_j), \ldots, K_0} d(j, s^k)$;

}
    If $d > \delta_j$ and $s_j \neq j_*$, no change;
    }
  }
  For $j = j_*$, {
    Find the closest leaf entry $C_{s^k}$ in each CF-tree $T_{CF}^k$ for $k = l(C_j), \ldots, K_0$;

Find $\delta_j = \min\limits_{s^k > j, k = l(C_j), \ldots, K_0} d(j, s^k)$ and $s_j = \arg\min\limits_{s^k > j, k = l(C_j), \ldots, K_0} d(j, s^k)$;

}
  For $j = j_* + 1, \ldots, s_{j_*} - 1$, {
    If $s_j = s_{j_*}$, {
      Find the closest leaf entry $C_{s^k}$ in each CF-tree $T_{CF}^k$ for $k = l(C_j), \ldots, K_0$;

Find $\delta_j = \min\limits_{s^k > j, k = l(C_j), \ldots, K_0} d(j, s^k)$ and $s_j = \arg\min\limits_{s^k > j, k = l(C_j), \ldots, K_0} d(j, s^k)$;

}
    If $s_j \neq s_{j_*}$, no change;
  }
  For $j = s_{j_*} + 1, \ldots, J$, no change;

Find $\delta_* = \min\limits_{j=1,\ldots,J} \delta_j$ and $j_* = \arg\min\limits_{j=1,\ldots,J} \delta_j$, the closest pair is $\langle j_*, s_{j_*} \rangle$;

}
Step 3. Export updated non-empty CF-trees;

While CF-tree based HAC may superficially appear to be very similar to matrix based HAC there is at least one difference that is not to be ignored. That difference is that CF-tree based HAC takes advantage of CF-tree structures to efficiently find the closest pair, rather than checking all possible pairs as in matrix based HAC. This results in a reduction in total resource usage that would not be possible using matrix based HAC.

Determination of the Number of Clusters:

Assume that the hierarchical clustering method has been used to produce 1, 2 . . . clusters already. The following two criterion indices, Bayesian Information Criterion (BIC) and Akaike Information Criterion (AIC), are considered in order to find the appropriate number of final clusters.

Bayesian Information Criterion (BIC) (J) is determined by equation 23, shown as follows:

$$BIC(j) = \sum_{k=1}^{K^A+K^B} BIC_k(J) = -2\sum_{j=1}^{J} \xi_j + m_J \ln(N)$$

Where N is the total number of cases in all the J clusters ($m_j$), is determined by equation 24, shown as follows:

$$m_j = J\{2K^A + \Sigma_{k=1}^{K^B}(L_k-1)\},$$

and $BIC_k(J)$ is determined by equation 25, shown as follows:

$$BIC_k(J) = \begin{cases} \sum_{j=1}^{J} N_{jk}\ln(\hat{\sigma}_{jk}^2 + \Delta_k) + 2J\ln(N), & \text{if feature } k \text{ is continuous} \\ 2\sum_{j=1}^{J} N'_{jk}\hat{E}_{jk} + J(L_k-1)\ln(N), & \text{if feature } k \text{ is categorical} \end{cases}$$

Akaike Information Criterion (AIC) (J), is determined by equation 26, shown as follows:

$$AIC(J) = \sum_{k=1}^{K^A+K^B} AIC_k(J) = -2\sum_{j=1}^{J} \xi_j + 2m_J$$

Where, $AIC_k(J)$ is determined by equation 27, shown as follows:

$$AIC_k(j) = \begin{cases} \sum_{j=1}^{J} N_{jk}\ln(\hat{\sigma}_{jk}^2 + \Delta_k) + 4J, & \text{if feature } k \text{ is continuous} \\ 2\sum_{j=1}^{J} N'_{jk}\hat{E}_{jk} + 2J(L_k-1), & \text{if feature } k \text{ is categorical} \end{cases}$$

Let I(J) be the criterion index (BIC or AIC) of J clusters, d(J) be the distance measure between the two clusters merged in merging J+1 clusters to J clusters, and $J_C$ be the total number of sub-clusters from which to determine the appropriate number of final clusters.

In some embodiments, users can supply the range for the number of clusters [$J_{min}, J_{max}$] in which they believe the "true" number of clusters should lie. Notice that if $J_C < J_{max}$, reset $J_{max} = J_C$. Notice that the criterion index I(J) can be defined as BIC(J) or AIC(J), and it can also be defined as $BIC_k(J)$ or $AIC_k(J)$. The former definition is used to find the optimal number of clusters when using all available features in clustering, while the latter one is to find the optimal number of clusters when using a single feature. This applies for the distance measure d(J) as well.

With this in mind, the following four methods are proposed for finding the number of clusters:

Method 1. Finding the Number of Clusters by Information Criterion Only.

To report $J_I = \arg\min_{J \in [J_{min}, J_{max}]} (I(J))$ as the number of clusters, where I(J) can be either BIC(J) or AIC(J) depending on user's choice.

Method 2. Finding the Number of Cluster by Distance Jump Only.

To report $J_d = 1 + \arg\max_{J \in [J_{min}-1, J_{max}-1]} (d(J)/d(J+1))$ as the number of clusters.

Method 3. Finding the Number of Clusters by Max($J_I$, $J_d$). To report max($J_I$, $J_d$) as the number of clusters.

Method 4. Finding the Number of Clusters by Min($J_I$, $J_d$). To report min($J_I$, $J_d$) as the number of clusters.

It is to be noted that, in default, method 4 is used with BIC as the information criterion.

Feature Selection:

Feature Filtering: Based on the available summary statistics, an initial analysis will be performed to determine the features which are not useful for making the clustering solution. Specifically, one or more of the following features, included in TABLE 5, shown below, will be excluded. The remaining features will be saved for adaptive feature selection in the next step.

TABLE 5

| # | Rule | Status | Comment |
| --- | --- | --- | --- |
| 1 | Frequency/analysis weight feature | Required | |
| 2 | Identity features | Required | |
| 3 | The percentage of missing values in any feature is larger than δ (default 0.7) | Required | |
| 4 | The distribution of the categories of a categorical feature is extremely imbalanced, that is RMSSE > δ (default 0.7) | Required | The statistic of RMSSE is the effect size for one sample chi-square test. |
| 5 | There are categories of a categorical feature with extremely high or low frequency, that is, the outlier strength is larger than δ (default 3) | Discarded | |
| 6 | The coefficient of variation of a continuous feature is smaller than δ (default 0.05) | Required | |

Adaptive Feature Selection:

Adaptive feature selection is used to select the most important features for the final clustering solution. Specifically, the adaptive feature selection performs the steps included in Table 6 as seen in FIG. 5.

The process described above can be implemented in parallel using one map-reduce job under the Hadoop framework. See Supplemental section A, further below, for details on the map-reduce implementation.

Implementation note: In certain embodiments, in default, the information based feature importance is used for the log-likelihood distance measure, and the effect size based feature importance is for the Euclidean distance.

Distributed Clustering:

Certain embodiments of the invention can identify clusters from distributed data with high performance and accuracy. Specifically, it performs the steps as seen in Table 7 of FIG. 6.

The process described above can be implemented in parallel using one map-reduce job under the Hadoop framework. See Supplemental section B for details of the map-reduce implementation.

Implementation notes: The number of computing units (Q) is given by equation 28 as follows:

$$Q = \lceil \min(R*S/D_1, D_2/C_{min}) \rceil$$

where $D_1$ (default 50,000) is the number of data points which are suitable to perform CF-tree based HAC, $D_2$ (default 5,000) is the number of data points which are suitable to perform matrix based HAC, $C_{min}$ is the minimal number of sub-clusters produced by each computing unit, and S is the maximal number of leaf entries, i.e. $B^H * L$, in a single CF-tree.

The number of sub-clusters produced by each computing unit, $J_1$, is given by equation 29 as follows:

$$J_1 = \lfloor \min(R*S, D_2)/Q \rfloor$$

Distributed Outlier Detection:

Outlier detection will be based and build upon the outlier handling method that was previously described above. Outlier detection is further extended into the distributed setting with the steps as seen in Table 8 of FIG. 7.

Outlier strength of a cluster $C_s$, O(s), is computed, as given by equation 30, as follows:

$$O(s) = \sum_{j=1}^{J} \frac{\tilde{d}(j,s)}{D_t(j)} p(j|s)$$

where $D_t(j)$ is the distance threshold of cluster $C_j$, which is the maximum distance from cluster $C_j$ to each center of its starting sub-clusters in matrix based HAC, $\tilde{d}(j,s)$ is the distance from cluster $C_j$ to the center of cluster $C_s$, and p(j|s) is the probability of cluster $C_s$ belonging to cluster $C_j$, that is given by equation 31 as follows:

$$p(j|s) = \frac{\exp(-\tilde{d}(j,s))}{\sum_{j=1}^{J} \exp(-\tilde{d}(j,s))}$$

Notice that the distance between the cluster center and a cluster $C_j$ is computed by considering the center of cluster $C_s$ as a singleton cluster $C_{s'}$. The cluster center herein is defined as the vector of proportional values $\hat{q}_{skl}$ for each category of any categorical feature, and clusters means $\hat{\mu}_{sk}$ for each continuous feature. In terms of cluster feature the cluster center as a singleton, $CF_{s'}$, is given by:

$$CF_{s'} = \{N_{s'}, \vec{N}_{s'}, s_{s'}, s_{s'}^2, N_{s'}^B\},$$

where $N_{s'} = 1$, $\vec{N}_{s'} = (1, \ldots, 1)$, $s_{s'} = (\hat{\mu}_{s1}, \ldots, \hat{\mu}_{sK^A})$, $S_{s'}^2 = (\hat{\mu}_{s1}^2, \ldots, \hat{\mu}_{sK^A}^2)$, $N_{s'}^B = (N_{s'1}^B, \ldots, N_{s'K^B}^B)$, and $N_{s'k}^B = (\hat{q}_{sk1}, \ldots, \hat{q}_{sk(L_k-1)})$ Note that $\vec{N}_{s'}$ may contain zero entries for those features which have missing values in all cases in cluster $C_s$.

Cluster Membership Assignment:

Without Outlier-Handling:

Without outlier-handling the case is assigned to the closest cluster according to the distance measure. Meanwhile, the probabilities of the case belonging to each regular cluster are produced.

With Outlier-Handling Using the Legacy Method:

Determine the log-likelihood distance: Assume outliers follow a uniform distribution. Calculate both the log-likelihood resulting from assigning a case to a noise cluster and that resulting from assigning it to the closest non-noise cluster. The case is then assigned to the cluster which leads to the larger log-likelihood. This is equivalent to assigning a case to its closest non-noise cluster if the distance between them is smaller than a critical value $C = \ln(\Pi_k R_k \Pi_m L_m)$, where $\Pi_k R_k$ is the product of ranges of continuous fields, and $\Pi_m L_m$ is the product of category numbers of categorical fields. Otherwise, designate the case as an outlier.

Determine the euclidean distance: Assign a case to its closest non-noise cluster if the Euclidean distance between them is smaller than a critical value C which is given by:

$$C = 2\sqrt{\frac{1}{JK_A} \sum_{j=1}^{J} \sum_{k=1}^{K_A} \hat{\sigma}_{jk}^2}$$

Otherwise, designate the case as an outlier.

New Method:

When scoring a new case, compute the outlier strength of the case. If the computed outlier strength is greater than the outlier threshold, then the case is an outlier and otherwise belongs to the closest cluster. Meanwhile, the probabilities of the case belonging to each regular cluster are produced. Alternatively, in some embodiments, users can specify a customized outlier threshold, e.g. 3, rather than using the one found from the data.

Clustering Model Evaluation:

Clustering model evaluation enables users to understand the identified cluster structure, and also to learn useful insights and interestingness derived from the clustering solution. Note that clustering model evaluation can be done using cluster features and also the hierarchical dendrogram when forming the clustering solution.

Across-Cluster Feature Importance:

Across-cluster feature importance indicates how influential a feature is in building the clustering solution. This measure is very useful for users to understand the clusters in their data. Moreover, it is helpful for feature selection, as described in a later section. Across-cluster feature importance can be defined using two methods, Information Criterion Based Method and Effect Size Based Method.

Information Criterion Based Method:

If BIC is used as the information criterion, the importance of feature k (Importance$_k$) is given by equation 32 as follows:

$$\text{Importance}_k = 1 - BIC_k(J)/BIC(J)$$

While if AIC is used, the importance of feature k (Importance$_k$) is given by equation 33 as follows:

$$\text{Importance}_k = 1 - AIC_k(J)/AIC(J)$$

Effect Size Based Method:

In some embodiments, this method shares some similarities to the method used for defining association interestingness for bivariate variables.

Categorical Feature:

For a categorical feature k, compute Pearson chi-square test statistic ($x_p^2$)

$$\chi_p^2 = \sum_{l=1}^{L_k} \sum_{j=1}^{J} \frac{(N_{jkl} - E_{jkl})^2}{E_{jkl}} \quad \text{(equation 34)}$$

where $$E_{jkl} = \frac{N_{jk\cdot} N_{\cdot kl}}{N_{\cdot k\cdot}} \quad \text{(equation 35)}$$

and $$N_{jk\cdot} = \sum_{l=1}^{L_k} N_{jkl} \quad \text{(equation 36)}$$

$$N_{\cdot kl} = \sum_{j=1}^{J} N_{jkl} \quad \text{(equation 37)}$$

$$N_{\cdot k\cdot} = \sum_{l=1}^{L_k} \sum_{j=1}^{J} N_{jkl} \quad \text{(equation 38)}$$

The $p_{value}$ is computed as:

$$p_{value} = \text{Prob}\{X^2 > \chi_p^2\}, \quad \text{(equation 39)}$$

In equation 39, $X^2$ is a random variable that follows a chi-square distribution with freedom degree of $(J-1)(L_k-1)$. Note that categories with $N_{jk\cdot}=0$ or $N_{\cdot kl}=0$ will be excluded when computing the statistic and degrees of freedom.

The effect size, $E_s$, Cramer's V, is given by equation 40 as follows:

$$E_s = \left(\frac{\chi_p^2}{N_{\cdot k\cdot}(q-1)}\right)^{1/2}$$

where $$q = \min(J, L_k). \quad \text{(equation 41)}$$

The importance of feature k (Importance$_k$) is produced by following a mapping function, as shown in equation 42 as follows:

$$\text{Importance}_k = \begin{cases} 0, & p_{value} \geq sig. \\ \text{MonotoneCubicInterpolation}(S_t, I_t, E_s), & p_{value} < sig. \end{cases}$$

where sig. is significance level (default 0.05), $S_t$ is a set of threshold values to assess effect size (default $S_t=\{0.0, 0.2, 0.6, 1.0\}$), $I_t$ is a set of corresponding thresholds of importance (default $I_t=\{0.00, 0.33, 0.67, 1.00\}$), and MonotoneCubicInterpolation($\cdot$) is a monotone cubic interpolation mapping function between $S_t$ and $I_t$.

Continuous Feature:

For a continuous feature k, compute F test statistic (F), equation 43, as follows:

$$F = \frac{SSR/(J-1)}{SSE/(N_{\cdot k}-J)} \quad \text{(equation 44)}$$

where $$SSR = \sum_{j=1}^{J} N_{jk}(\hat{\mu}_{jk} - \hat{\mu}_k)^2$$

$$SSE = \sum_{j=1}^{J} N_{jk}\hat{\sigma}_{jk}^2 \quad \text{(equation 45)}$$

$$N_{\cdot k} = \sum_{j=1}^{J} N_{jk} \quad \text{(equation 46)}$$

$$\hat{\mu}_k = \frac{\sum_{j=1}^{J} N_{jk}\hat{\mu}_{jk}}{N_{\cdot k}}. \quad \text{(equation 47)}$$

The F statistic is undefined if the denominator equals zero. Accordingly, the $p_{value}$ is calculated, in equation 48 as follows:

$$p_{value} = \begin{cases} \text{undefined}, & \text{if both the numerator and denominator of } F \text{ are zero;} \\ 0, & \text{else if the denominator of } F \text{ is zero;} \\ \text{Prob}\{F(J-1, N_{\cdot k}-J) > F\}, & \text{else.} \end{cases}$$

In which $F(J-1, N_{\cdot k}-J)$ is a random variable that follows a F-distribution with degrees of freedom $J-1$ and $N_{\cdot k}-J$.

The effect size, $E_s$, Eta square, is given by equation 49, as follows:

$$E_s = 1 - \frac{\sum_{j=1}^{J} N_{jk}\hat{\sigma}_{jk}^2}{N_{\cdot k}\hat{\sigma}_k^2} \quad \text{(equation 50)}$$

where $$\hat{\sigma}_k^2 = \frac{\sum_{j=1}^{J} s_{jk}^2 - N_{\cdot k}\hat{\mu}_k^2}{N_{\cdot k}}$$

The importance of feature k is produced using the same mapping function as (equation 42), and default $S_t=\{0.0, 0.04, 0.36, 1.0\}$.

Within-Cluster Feature Importance:

Within-cluster feature importance indicates how influential a feature is in forming a cluster. Similar to across-cluster feature importance, within-cluster feature importance can also be defined using an Information Criterion Based Method or an Effect Size Based Method.

Information Criterion Based Method:

If BIC is used as the information criterion, the importance of feature k within cluster $C_j$ (j=1, . . . , J) is Importance$_{k,j}$ as given by equation 51 as follows:

$$\text{Importance}_{k,j} = 1 - BIC_{k,j}/BIC_j$$

Where equation 52 yields $BIC_{k,j}$ as follows:

$$BIC_{k,j} = \begin{cases} N_{jk} \ln(\hat{\sigma}_{jk}^2 + \Delta_k) + 2\ln(N), & \text{if feature } k \text{ is continuous} \\ 2N'_{jk}\hat{E}_{jk} + (L_k - 1)\ln(N), & \text{if feature } k \text{ is categorical} \end{cases}$$

And equation 53 yields $BIC_j$ as follows:

$$BIC_j = \sum_{k=1}^{K^A+K^B} BIC_{k,j}$$

If AIC is used as the information criterion, the importance of feature k within cluster $C_j$ (j=1, ..., J) is Importance$_{k,j}$ given by equation 54 as follows:

$$\text{Importance}_k = 1 - AIC_{k,j}/AIC_j$$

Where equation 55 yields $AIC_{k,j}$ as follows:

$$AIC_{k,j} = \begin{cases} N_{jk} \ln(\hat{\sigma}_{jk}^2 + \Delta_k) + 4, & \text{if feature } k \text{ is continuous} \\ 2N'_{jk}\hat{E}_{jk} + 2(L_k - 1), & \text{if feature } k \text{ is categorical} \end{cases}$$

And equation 56 yields $AIC_j$ as follows:

$$AIC_j = \sum_{k=1}^{K^A+K^B} AIC_{k,j}$$

Effect Size Based Method:

Within-cluster importance is defined by comparing the distribution of the feature within a cluster with the overall distribution. This is applied to both categorical features and continuous features.

Categorical Feature:

For cluster $C_j$ (j=1, ..., J) and a categorical feature k, compute Pearson chi-square test statistic using equation 57 as follows:

$$\chi_p^2 = \sum_{l=1}^{L_k} \frac{(N_{jkl} - E_{jkl})^2}{E_{jkl}}$$

Where equation 58 yields $E_{jkl}$ as follows:

$$E_{jkl} = \frac{N_{jk}.N_{.kl}}{N_{.k.}}$$

The p-value is computed, using equation 59, as follows:

$$p_{value} = \text{Prob}\{X^2 > \chi_p^2\}$$

in which $X^2$ is a random variable that follows a chi-square distribution with freedom degree of $L_k - 1$. Note that importance for feature k within cluster $C_j$ will be undefined if $N_{jk}$ equals zero.

The effect size ($E_s$) is given by equation 60, as follows:

$$E_s = \left(\frac{\chi_p^2}{N_{jk}.(L_k - 1)}\right)^{\frac{1}{2}}$$

The importance of feature k within cluster $C_j$ is produced using the same mapping function as (42), and default $S_r = \{0.0, 0.2, 0.6, 1.0\}$.

Continuous Feature:

For cluster $C_j$ (j=1, ..., J) and a continuous feature k, compute t test statistic (t) using equation 61, as follows:

$$t = \frac{\hat{\mu}_{jk} - \hat{\mu}_k}{s_d / \sqrt{N_{jk}}}$$

Where equation 62 yields $s_d$ as follows:

$$s_d = \sqrt{\frac{N_{jk}}{N_{jk} - 1} \hat{\sigma}_{jk}^2}$$

Equation 63 yields the $p_{value}$ as follows:

$$p_{value} = \begin{cases} \text{undefined}, & \text{if both the numerator and denominator of } t \text{ are zero;} \\ 0, & \text{else if the denominator of } t \text{ is zero;} \\ 1 - \text{Prob}\{|T(N_{jk} - 1)| \leq |t|\}, & \text{else} \end{cases}$$

in which $T(N_{jk}-1)$ is a random variable that follows a t-distribution with degrees of freedom $N_{jk}-1$.

The effect size ($E_s$) is given by equation 64, as follows:

$$E_s = \frac{\hat{\mu}_{jk} - \hat{\mu}_k}{s_d}$$

The importance of feature k within cluster $C_j$ is produced using the same mapping function as (equation 42), and default $S_r = \{0.0, 0.2, 0.6, 1.0\}$.

Clustering Model Goodness:

Clustering model goodness indicates the quality of a clustering solution. This measure will be computed for the final clustering solution, and it will also be computed for approximate clustering solutions during the process of adaptive feature selection.

Suppose there are J regular clusters, denoted as $C_1, ..., C_J$. Let l(i) be the regular cluster label assigned to sub-cluster i. Then for each sub-cluster i, the Silhouette coefficient ($S_i$) is computed approximately by equation 65 as follows:

$$S_i = \frac{\Omega - \Phi}{\max(\Phi, \Omega)}$$

where $\Phi$ is the weighted average distance from sub-cluster i to every other sub-cluster assigned to the same regular cluster and is given by equation 66, as follows:

$$\Phi = \frac{\sum_{s \neq i \text{ and } l(s)=l(i)} N_s d(i,s)}{\sum_{s \neq i \text{ and } l(s)=l(i)} N_s}$$

$\Omega$ is the minimal average distance from sub-cluster i to sub-clusters in a different regular cluster among all different regular clusters, and is given by equation 67, as follows:

$$\Omega = \min \left\{ \frac{\sum_{l(s)=c_j} N_s d(i,s)}{\sum_{l(s)=c_j} N_s} \,\middle|\, j=1,\ldots,J \text{ and } C_j \neq l(i) \right\}$$

Clustering model goodness is defined as the weighted average Silhouette coefficient over all starting sub-clusters in the final stage of regular HAC, and is given by equation 68, as follows:

$$\text{Goodness} = \frac{\sum_j N_j S_j}{\sum_j N_j}$$

The average Silhouette coefficient ranges between −1 (indicating a very poor model) and +1 (indicating an excellent model). An average Silhouette greater than 0.5 indicates reasonable partitioning of data; lower than 0.2 means that data does not exhibit cluster structure. In this regard, the following function is used to map Goodness into an interestingness score and is given by equation 69, as follows:

Interestingness(Goodness)=MonotoneCubicInterpolation($S_t, I_t$, Goodness)

where $S_t = \{-1.0, 0.2, 0.5, 1.0\}$, and $I_t = \{0.0, 0.0, 0.5, 1.0\}$.

Special Clusters:

With the clustering solution, special clusters are found, which could be regular clusters with high quality, extreme outlier clusters, and so on.

Regular Cluster Ranking:

In order to select the most useful or interesting regular clusters, clusters are ranked according to any of the measures described below.

Cluster tightness: Cluster tightness is given by equation (9) or (15). Cluster tightness is not scale-free, and it is a measure of cluster cohesion.

Cluster importance: Cluster importance indicates the quality of the regular cluster in the clustering solution. A higher importance value means a better quality of the regular cluster.

If BIC is used as the information criterion, then the importance for regular cluster $C_j$ (Importance$_j$) is given by equation 70, as follows:

Importance$_j$=1−BIC$_j$/BIC(J)

If AIC is used as the information criterion, then the importance for regular cluster $C_j$ (Importance$_j$) is given by equation 71, as follows:

Importance$_j$=1−AIC$_j$/AIC(J)

Cluster importance is scale-free and, from certain perspectives, is a normalized measure of cluster cohesion.

Cluster Goodness:

The goodness measure for regular cluster $C_j$ is defined as the weighted average Silhouette coefficient over all starting sub-clusters in regular cluster $C_j$ (Goodness$_j$) and is given by equation 72, as follows:

$$\text{Goodness}_j = \frac{\sum_{l(i)=c_j} N_i S_i}{\sum_{l(i)=c_j} N_i}$$

It should be noted that Goodness$_j$ can also be mapped into an interestingness score using equation 69. Cluster goodness is also scale-free, and it is a measure of balancing cluster cohesion and cluster separation.

Outlier Clusters Ranking:

For each outlier cluster, cluster size and outlier strength are determined. Each of the measures can be used to rank outlier clusters.

Outlier Clusters Grouping:

Outlier clusters can be grouped by the nearest regular cluster, using probability values.

Supplemental Section A:

Map-Reduce Job for Feature Selection:

Mapper:

Each mapper will handle one data split, and use it to build a local CF-tree. The local CF-tree is assigned with a unique key. Notice that if the option of outlier handling is turned on, outliers will not be passed to reducers in case of feature selection.

a. Let $T_{CF}^{(r)}(\text{key}_r)$ be the CF-tree with the key of key$_r$ on data split r (r=1, ..., R).

The map function is as follows in table 9:

TABLE 9

```
Inputs:
    - Data split r          // r = 1, ... , R
    - key_r                 // r = 1, ... , R
    <Parameter settings>
    - MainMemory            // Default 80*1024 bytes
    - OutlierHandling       // {on, off}, default on
    - OutlierHandlingDiskSpace   // Default 20% of MainMemory
    - OutlierQualification  // Default 10 cases
    - DelayedSplit          // {on, off}, default on
    - DelayedSplitDiskSpace // Default 10% of MainMemory
    - Adjustment            // Default 1/6
    - DistanceMeasure       // {Log-likelihood, Euclidean}, default
                            // Log-likelihood
    - InitialThreshold      // Default 0
    - NonLeafNodeBranchingFactor  // Default 8
    - LeafNodeBranchingFactor     // Default 8
    - MaxTreeHeight         // Default 3
```

TABLE 9-continued

Outputs:
- $T_{CF}^{(r)}(key_r)$

Procedure:
1. Build a CF-tree on data split r based on specified features and settings;
2. Assign $key_r$ to the CF-tree;
3. Export $T_{CF}^{(r)}(key_r)$;

Reducer:

Each reducer can handle several keys. For each key, it first pours together all CF-trees which have the same key. Then the reducer builds approximate clustering solutions iteratively in order to find the most influential features. The selected features are passed to the controller.

a. Let $F^*(key_r)$ be the set of features produced for the key of $key_r$, r=1, ..., R.

The reduce function for each key is as follows in table 10:

Controller:

The controller pours together all sets of features produced by reducers, and selects those features which appear frequently. The selected features will be used in the next map-reduce job to build the final clustering solution. The controller runs the following procedure in Table 11, shown as follows:

TABLE 10

Inputs:
- $T_{CF}^{(r)}(key_r)$

<Parameter settings>
- Adjustment              // Default 1/6
- DistanceMeasure         // {Log-likelihood, Euclidean}, default Log-
                          // likelihood
- AutoClustering          // {on, off}, default on
- MaximumClusterNumber    // Default 15
- MinimumClusterNumber    // Default 2
- FixedClusterNumber      // Default 5
- ClusteringCriterion     // {BIC, AIC}, default BIC
- AutoClusteringMethod    // {information criterion, distance jump,
                          // maximum, minimum}, default minimum
- DiscardFeatureNumber    // Default 1
- FeatureImportance       // {information criterion, effect size}

Outputs:
- $F^*(key_r)$

Procedure:
1. Let α= DiscardFeatureNumber;
2. Let $F(key_r)$ be the set of all available features, and Goodness be zero;
3. With all leaf entries in CF-tree $T_{CF}^{(r)}(key_r)$ and using features $F(key_r)$,
    perform matrix based HAC to get the set of approximate final clusters.
    Suppose the number of approximate final clusters is J*, which is determined
    automatically or using a fixed one depending on the settings;
4. Compute the goodness measure for the approximate clustering solution;
5. If the computed goodness measure is larger than Goodness,{
    Update Goodness;
    Let $F^*(key_r) = F(key_r)$;
        Compute feature importance for each feature in $F(key_r)$;
        Decompose information criterion and distance measure by features for
        each clustering solution along the hierarchical dendrogram with the
        number of clusters between $J_{min}$ and $J_{max}$;
        If AutoClustering is off,{
            Find $F_α(key_r)$, the set of the most unimportant α features
                in $F(key_r)$;
            Let $F(key_r) = F(key_r) - F_α(key_r)$;
        }
        Else,{
            Let $\hat{J}^* = J^*$, and $F\_(key_r) = F(key_r)$;
            While $\hat{J}^* \geq J^*$,{
                Let $F(key_r) = F\_(key_r)$;
                Find $F_α(key_r)$, the set of the most unimportant α features
                    in $F(key_r)$;
                Let $F\_(key_r) = F(key_r) - F_α(key_r)$;
                    Determine the optimal number of clusters $\hat{J}^*$ with the set of
                        features $F\_(key_r)$;
            }
        }
        Go to step 3.
    }
6. Export $F^*(key_r)$;

TABLE 11

Inputs:
    <Parameter settings>
        - MinFrequency    // Default 50%
Outputs:
        - F*    // Set of selected features
Procedure:
1. Let $\beta$= MinFrequency, and F* be empty;
2. Launch a map-reduce job, and get F*(key$_r$), for r = 1, ... , R from the reducers;
3. Compute $F = \cup_{r=1}^{R} F^*(key_r)$;
4. For each feature in F,
    If the occurring frequency is larger than R * $\beta$, add the feature into F*;
5. Export F*;

Supplemental Section B:
Map-Reduce Job for Distributed Clustering.
Mapper:

Each mapper will handle one data split, and use it to build a local CF-tree. Once the local CF-tree is built, each leaf entry is checked again for outliers. These outliers, together with cases in disk space $S_1$ and entries in disk space $S_2$ are considered as local outlier candidates.

Local outlier candidates and the local CF-tree will be distributed to a certain reducer. This is achieved by assigning them a key, which is randomly selected from the key set $\{key_1, \ldots, key_Q\}$. The number of keys Q is computed by (equation 28).

For convenience, in the following, call leaf entries as pre-clusters. Let $T_{CF}^{(r)}(key_i)$ and $S_{out}^{(r)}(key_i)$ be the CF-tree and the set of outliers, respectively, with the key of $key_i$ (i=1, ... , Q), on data split r (r=1, ... , R). The map function is as follows in Table 12, shown as follows.

TABLE 12

Inputs:
    - Data split r    // r = 1, ... , R
    - key$_i$    // i = 1, ... , Q
    <Parameter settings>
        - MainMemory    // Default 80*1024 bytes
        - OutlierHandling    // {on, off}, default on
        - OutlierHandlingDiskSpace    // Default 20% of MainMemory
        - OutlierQualification    // Default 10 cases
        - DelayedSplit    // {on, off}, default on
        - DelayedSplitDiskSpace    // Default 10% of MainMemory
        - Adjustment    // Default 1/6
        - DistanceMeasure    // {Log-likelihood, Euclidean}, default
            // Log-likelihood
        - InitialThreshold    // Default 0
        - NonLeafNodeBranchingFactor    // Default 8
        - LeafNodeBranchingFactor    // Default 8
        - MaxTreeHeight    // Default 3
Outputs:
    - $T^{(r)}(key_i)$    // Tightness threshold
    - $T_{CF}^{(r)}(key_i)$
    - $S_{out}^{(r)}(key_i)$
Procedure:
1. Build a CF-tree on data split r based on specified features and settings;
2. If (OutlierHandling='on'),{
    Check the built CF-tree for outlier;
    Mark the identified outliers, cases in disk space $S_1$, and entries in disk space $S_2$ as local outlier candidates;
    }
3. Assign key$_i$ to the CF-tree and the set of outlier candidates;
4. Export $T^{(r)}(key_i)$, $T_{CF}^{(r)}(key_i)$, and $S_{out}^{(r)}(key_i)$;

Reducer:

Each reducer can handle several keys. For each key, it first pours together all CF-trees which have the same key. Then with all leaf entries in the involved CF-trees, it performs a series of CF-tree based HACs to get a specified number of sub-clusters. Finally, the sub-clusters are passed to the controller. The number of sub-clusters produced for each key is computed by (equation 29).

Let $\Omega(key_i)$ be the set of data split indices r whose key is $key_i$, $S_{sub}(key_i)$ and $S_{out}(key_i)$ be the set of sub-clusters and the set of outliers, respectively, produced for the key of $key_i$, i=1, ... , Q.

The reduce function for each key is as follows in Table 13, shown as follows.

TABLE 13

Inputs:
    - $T^{(r)}(key_i)$, $r \in \Omega(key_i)$
    - $T_{CF}^{(r)}(key_i)$, $r \in \Omega(key_i)$
    - $S_{out}^{(r)}(key_i)$, $r \in \Omega(key_i)$

TABLE 13-continued

```
     <Parameter settings>
        - OutlierHandling        // {on, off}, default on
        - Adjustment             // Default 1/6
        - DistanceMeasure        // {Log-likelihood, Euclidean}, default Log-
                                 // likelihood
        - NumSubClusters         // Number of sub-clusters produced for each key
        - MinSubClusters         // Minimum sub-clusters produced for each key
                                 // default 500
        - MaximumDataPoitsCFHAC  // Maximum data points for HAC, default
          50,000
Outputs:
        - $S_{sub}(key_i)$
        - $S_{out}(key_i)$
Procedure:
1. Let $J_1$= NumSubClusters, $C_{min}$= MinSubClusters, and $D_1$=
     MaximumDataPoitsCFHAC;
2. Compute $T(key_i) = \max\{T^{(r)}(key_i), r \in \Omega(key_i)\}$;
3. Compute $S_{CF}(key_i) = \{T_{CF}^{(r)}(key_i) | r \in \Omega(key_i)\}$;
4. If OutlierHandling is 'on',{
        Compute $S_{out}(key_i) = \cup_{r \in \Omega(key_i)} S_{out}^{(r)}(key_i)$;
        For each member in $S_{out}(key_i)$,{
             Find the closest leaf entry in the set of CF-trees $S_{CF}(key_i)$;
             If the closest leaf entry can absorb the outlier member without
             violating the threshold requirement $T(key_i)$, then merge them, and
             update $S_{out}(key_i)$ and the involved CF-tree;
        }
   }
5. Let $c_1$ be the total number of leaf entries in $S_{CF}(key_i)$;
     While $c_1 > D_1$,{
        Divide the set of CF-trees $S_{CF}(key_i)$ randomly into $c_2$ groups,
        where $c_2 = \lceil c_1/D_1 \rceil$;
        For each group which has a larger number of leaf entries than $c_3$, perform CF-
             tree based HAC to get $c_3$ leaf entries, where $c_3 = \lfloor \max(D_1/c_2, C_{min}) \rfloor$;
        Update $S_{CF}(key_i)$ with new CF-trees produced in the above step;
        Compute the total number of remaining leaf entries $c_1$;
     }
6. With the set of CF-trees $S_{CF}(key_i)$, perform CF-tree based HAC to get a set of $J_1$
     sub-clusters, i.e. $S_{sub}(key_i)$;
7. Export $S_{sub}(key_i)$ and $S_{out}(key_i)$;
```

Controller:

The controller pours together all sub-clusters produced by reducers, and performs matrix based HAC to get the final clusters. The controller identifies outlier clusters as well if the option of outlier handling is turned on. Moreover, the controller computes model evaluation measures, and derives insights and interestingness from the clustering results.

The controller runs the following procedure in Table 14, shown as follows.

TABLE 14

```
Inputs:
     <Parameter settings>
        - MainMemory              // Default 80*1024 bytes
        - OutlierHandling         // {on, off}, default on
        - OutlierHandlingDiskSpace // Default 20% of MainMemory
        - OutlierQualification    // Default 10 cases
        - ExtremeOutlierClusters  // Default 20
        - DelayedSplit            // {on, off}, default on
        - DelayedSplitDiskSpace   // Default 10% of MainMemory
        - Adjustment              // Default 1/6
        - DistanceMeasure         // {Log-likelihood, Euclidean}, default
                                  // Log-likelihood
        - InitialThreshold        // Default 0
        - NonLeafNodeBranchingFactor // Default 8
        - LeafNodeBranchingFactor // Default 8
        - MaximumTreeHeight       // Default 3
        - AutoClustering          // {on, off}, default on
        - MaximumClusterNumber    // Default 15
        - MinimumClusterNumber    // Default 2
        - FixedClusterNumber      // Default 5
        - ClusteringCriterion     // {BIC, AIC}, default BIC
        - AutoClusteringMethod    // {information criterion, distance jump,
                                  // maximum, minimum}, default minimum
        - MinSubClusters          // Minimum sub-clusters produced for each key,
                                  // default 500
        - MaxDataPointsCFHAC      // Maximum data points for CF-tree based
          HAC,
                                  // default 50,000
```

TABLE 14-continued

```
        - MaxDataPoitsMatrixHAC         // Maximum data points for matrix based
            HAC,
                        // default 5,000
Outputs:
        - PMML
        - StatXML
Procedure:
1. Let C_min = MinSubClusters, D_1 = MaximumDataPoitsCFHAC, and D_2 =
        MaximumDataPoitsMatrixHAC;
2. Compute the number of keys
    NumKeys = Q = ⌈min(R * S/D_1, D_2/C_min)⌉;
        // Each mapper is assigned a key which is selected randomly from the Q keys
3. Compute the number of sub-clusters produced for each key
    NumSubClusters = ⌊min(R * S, D_2)/Q⌋;
4. Launch a map-reduce job, and get S_sub(key_i) and S_out(key_i), for i = 1, ... , Q;
5. Compute S_sub = ∪_{i-1}^Q S_sub(key_i);
6. Perform matrix based HAC on S_sub to get the set of final regular clusters S_sub*,
        where the number of final clusters is determined automatically or using a fixed
        one depending on the settings;
7. If OutlierHandling is 'on', perform the steps from 2) to 7) in Step 3 in section 9.3;
8. Compute model evaluation measures, insights, and interestingness;
9. Export the clustering model in PMML, and other statistics in StatXML;
```

Implementation notes: The general procedure of the controller consists of both the controller procedure in appendix A and that in appendix B.

Supplemental Section C:

Procedure for MonotoneCubicInterpolation( ).

$$f(x) = \text{MonotoneCubicInterpolation}(S_t, I_t, x)$$

Where X is the input statistic that characterizes fields or field pairs in particular aspects, e.g. distribution, association strength, etc. Its value range must be bounded below, and it must have a monotonically increasing relationship with the interestingness score threshold values. If the two conditions are not met, then a conversion (e.g. $x=-x'$ or $x=|x|$, etc) should be carried out.

$S_t$ is a set of distinct threshold values for the input statistics, which have been accepted and commonly used by expert users to interpret the statistics. The positive infinity ($+\infty$) is included if the input statistic is not bounded from above.

$I_t$ is a set of distinct threshold values for the interestingness scores that $S_t$ corresponds to. The threshold values must be between 0 and 1.

The size of $S_t$ and $I_t$ must be the same. There are at least two values in $S_t$ excluding positive infinity ($+\infty$).

Pre-Processing:

Let $\{x_k\}$=sorted($S_t$) such that $x_1 < \ldots < x_n$, where n is the number of values in $S_t$.

Let $\{y\}$=sorted($I_t$) such that $y_1 < \ldots < y_n$.

Condition A:

There are more than two threshold values for input statistics, and they are all finite numbers.

Preparing for Cubic Interpolation:

The following steps should be taken for preparing a cubic interpolation function construction.

Step 1: compute the slopes of the secant lines between successive points.

$$\Delta_k = \frac{y_{k+1} - y_k}{x_{k+1} - x_k}$$

for k=1, . . . , n−1.

Step 2: Initialize the tangents at every data point as the average of the secants, $$m_k = \frac{\Delta_{k-1} + \Delta_k}{2}$$

for k=2, . . . , n−1; these may be updated in further steps. For the endpoints, use one-sided differences: $m_1=\Delta_1$ and $m_n=\Delta_{n-1}$.

Step 3: let $\alpha_k=m_k/\Delta_k$ and $\beta_k=m_{k+1}/\Delta_k$ for k=1, . . . , n−1.

If $\alpha$ or $\beta$ are computed to be zero, then the input data points are not strictly monotone. In such cases, piecewise monotone curves can still be generated by choosing $m_k=m_{k+1}=0$, although global strict monotonicity is not possible.

Step 4: Update $m_k$

If $\alpha^2 + \beta^2 > 9$, then set $m_k = \tau_k \alpha_k \Delta_k$ and $$m_{k+1} = \tau_k \beta_k \Delta_k \text{ where } \tau_k = \frac{3}{\sqrt{\alpha^2 + \beta^2}}.$$

Note: Only one pass of the algorithm is required. For k=1, . . . , n−1, if $\Delta_k=0$ (if two successive $y_k=y_{k+1}$ are equal), then set $m_k=m_{k+1}=0$, as the spline connecting these points must be flat to preserve monotonicity. Ignore step 3 and 4 for those k.

Cubic Interpolation:

After the preprocessing, evaluation of the interpolated spline is equivalent to cubic Hermite spline, using the data $x_k$, $y_k$, and $m_k$ for k=1, . . . , n.

To evaluate x in the range $[x_k, x_{k+1}]$ for k=1, . . . , n−1, calculate:

$$h = x_{k+1} - x_k \text{ and } t = \frac{x - x_k}{h}$$

then the interpolant is $$f(x) = y_k h_{00}(t) + h^* m_k h_{10}(t) + y_{k+1} h_{01}(t) + h^* m_{k+1} h_{11}(t)$$

where hii(t) are the basis functions for the cubic Hermite spline (see Table 15, shown as follows).

TABLE 15

| | |
|---|---|
| $h_{00}(t)$ | $2t^3 - 3t^2 + 1$ |
| $h_{10}(t)$ | $t^3 - 2t^2 + t$ |
| $h_{01}(t)$ | $-2t^3 + 3t^2$ |
| $h_{11}(t)$ | $t^3 - t^2$ |

Condition B:

There are Two Threshold Values for Input Statistics.

As shown in a previous section(s), there are at least two values in $S_t$ excluding positive infinity ($+\infty$), they must be both finite numbers when there are only two threshold values.

In this case, the mapping function is a straight line connecting $(x_1, y_1)$ and $(x_2, y_2)$.

$$f(x) = y_1 + (y_2 - y_1)\frac{x - x_1}{x_2 - x_1}$$

Condition C:

Threshold Values Include Infinity.

Note that there are at least two values in $S_t$ excluding positive infinity ($+\infty$). Take the last three statistic threshold values and threshold values for the interestingness scores from the sorted lists, yielding three pairs of data $(x_{n-2}, y_{n-2})$, $(x_{n-1}, y_{n-1})$ and $(+\infty, y_n)$.

An exponential function, such as:

$$f(x) = a - be^{-cx}$$

can be defined by the pairs, where:

$$a = y_n$$
$$b = {}^{(x_{n-1} - x_{n-2})}\sqrt{(y_n - y_{n-2})^{x_{n-1}} / (y_n - y_{n-1})^{x_{n-2}}}$$
$$c = \frac{1}{x_{n-1} - x_{n-2}} \ln \frac{y_n - y_{n-2}}{y_n - y_{n-1}}$$

If n=3, which means there are only two distinct values in $S_t$ excluding positive infinity ($+\infty$), then the exponential function is employed for evaluating x in the range $[x_1, +\infty)$. Otherwise, the exponential function is for evaluating x in the range $[x_{n-1}, +\infty)$.

To evaluate x in the range $[x_1, x_{n-1})$, use procedures under "condition A: There are more than two threshold values for input statistics, and they are all finite numbers" with data set $\{x_1, \ldots, x_{n'}\}$ and $\{y_1, \ldots, y_{n'}\}$ where n'=n-1. To insure a smooth transition to the exponential function, the tangent $m_{n'}$ at data point $x_{n'}$ is given as:

$$m_{n'} = \frac{d(a - be^{-cx})}{dx}\bigg|_{x=x_{n'}} = bce^{-cx_{n'}}$$

again $$a = y_n$$
$$b = {}^{(x_{n-1} - x_{n-2})}\sqrt{(y_n - y_{n-2})^{x_{n-1}} / (y_n - y_{n-1})^{x_{n-2}}}$$
$$c = \frac{1}{x_{n-1} - x_{n-2}} \ln \frac{y_n - y_{n-2}}{y_n - y_{n-1}}$$

What is claimed is:

1. A method of selecting cluster variables, the method comprising:
    generating, by one or more processors, a plurality of subsets of a plurality of cluster feature (CF)-trees, wherein each CF-tree represents a respective set of local data as leaf entries;
    collecting, by one or more processors, a plurality of variables that were used to generate a plurality of CF-trees included in a subset;
    generating, by one or more processors, respective approximate clustering solutions for the plurality of subsets by applying hierarchical agglomerative clustering to, at least in part, the collected variables and leaf entries of the plurality of CF-trees;
    selecting, by one or more processors, a plurality of candidate sets of variables with maximal goodness that are locally optimal for respective subsets based, at least in part, on the approximate clustering solutions;
    selecting, by one or more processors, a set of variables from the plurality of candidate sets of variables that produces an overall clustering solution; and
    saving, by one or more processors, the set of variables.

2. The method of claim 1, the method further comprising:
    generating, by one or more processors, the plurality of CF-trees by applying a sequential clustering approach to the respective set of local data.

3. The method of claim 1, wherein CF-trees are randomly assigned to subsets based, at least in part, on a number of instances of a program that is configured to generate approximate clustering solutions.

4. The method of claim 3, wherein the number of instances of the program that is configured to generate approximate clustering solutions is based on available computing resources and a strategy of balancing accuracy and performance of clustering.

5. The method of claim 1, the method further comprising:
    determining, by one or more processors, a goodness measure for the approximate clustering solution;
    determining, by one or more processors, a goodness measure for the variables included in the approximate clustering solution;
    determining, by one or more processors, whether the goodness measure for the approximate clustering solution will be improved by discarding one or more variables that have lower goodness measures compared to other variables included in the approximate clustering solution; and
    responsive to a determination that discarding one or more variables will improve the goodness measure for the approximate clustering solution, discarding, by one or more processors, one or more variables included in the approximate clustering solution that have lower goodness measures.

6. The method of claim 1, wherein a variable, included in the set of variables that are selected from the plurality of candidate sets of variables, is selected based, at least in part, on a frequency of appearance of that variable among the candidate sets of variables.

7. The method of claim 1, the method further comprising:
    discarding, by one or more processors, one or more variables of an approximate clustering solution of a subset, included in the plurality of subsets, based, at least in part, on a number of leaf entries that are represented by the one or more variables.

\* \* \* \* \*